United States Patent
Van Buuren et al.

(10) Patent No.: US 12,471,546 B2
(45) Date of Patent: *Nov. 18, 2025

(54) HYRDOPONICS

(71) Applicant: EDEN GREEN GLOBAL TECHNOLOGIES LIMITED, Dublin (IE)

(72) Inventors: Eugene Van Buuren, Pretoria (ZA); Jacques Van Buuren, Pretoria (ZA); Jan Ehlers, Centurion (ZA)

(73) Assignee: EDEN GREEN GLOBAL TECHNOLOGIES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,464

(22) Filed: Feb. 20, 2023

(65) Prior Publication Data

US 2023/0200321 A1    Jun. 29, 2023

Related U.S. Application Data

(63) Continuation of application No. 16/503,209, filed on Jul. 3, 2019, now Pat. No. 11,602,106.

(60) Provisional application No. 62/694,760, filed on Jul. 6, 2018.

(51) Int. Cl.
| | | |
|---|---|---|
| *A01G 31/06* | (2006.01) | |
| *A01G 7/00* | (2006.01) | |
| *A01G 9/02* | (2018.01) | |
| *A01G 9/029* | (2018.01) | |
| *A01G 9/12* | (2006.01) | |
| *A01G 27/00* | (2006.01) | |

(52) U.S. Cl.
CPC .............. *A01G 31/06* (2013.01); *A01G 7/00* (2013.01); *A01G 9/023* (2013.01); *A01G 9/029* (2018.02); *A01G 9/12* (2013.01); *A01G 27/005* (2013.01)

(58) Field of Classification Search
CPC .......... A01G 31/06; A01G 7/00; A01G 9/029; A01G 27/005; A01G 9/023; A01G 2031/006; A01G 31/02; A01G 27/006; A01G 9/022; A01G 9/0295; A01G 9/025
See application file for complete search history.

(56) References Cited

U.S. PATENT DOCUMENTS

| | | |
|---|---|---|
| 3,432,965 A | 3/1969 | Smith et al. |
| 3,483,656 A | 12/1969 | Baumann |
| 3,660,933 A | 5/1972 | Wong, Jr. |
| 4,033,072 A | 7/1977 | Kobayashi et al. |
| 4,059,922 A | 11/1977 | DiGiancinto |
| 4,310,990 A | 1/1982 | Payne |
| 4,389,813 A | 6/1983 | Jacques et al. |

(Continued)

FOREIGN PATENT DOCUMENTS

| | | |
|---|---|---|
| CA | 2488178 | 2/2006 |
| CN | 1287774 | 3/2001 |

(Continued)

OTHER PUBLICATIONS

Office Action issued in corresponding Japanese Patent Application No. 2021-523118, dated Sep. 4, 2023. (English Translation Provided).

(Continued)

*Primary Examiner* — Trinh T Nguyen
(74) *Attorney, Agent, or Firm* — Norton Rose Fulbright US LLP

(57) ABSTRACT

The disclosure relates to a planter.

19 Claims, 32 Drawing Sheets

(56) References Cited

U.S. PATENT DOCUMENTS

| | | | |
|---|---|---|---|
| 4,513,533 | A | 4/1985 | Gething et al. |
| 4,779,378 | A | 10/1988 | Mason, Jr. |
| 5,276,997 | A | 1/1994 | Swearengin et al. |
| 5,385,590 | A | 1/1995 | Sledge |
| 5,502,923 | A | 4/1996 | Bradshaw |
| 5,533,302 | A | 7/1996 | Lynch et al. |
| 5,555,676 | A | 9/1996 | Lund |
| 5,724,768 | A | 3/1998 | Ammann, Jr. |
| 6,065,245 | A | 5/2000 | Seawright |
| 6,389,751 | B1 | 5/2002 | Wang |
| 6,470,625 | B1 | 10/2002 | Byun |
| 6,502,350 | B1 | 1/2003 | Dick |
| 6,840,008 | B1 | 1/2005 | Bullock et al. |
| 7,055,282 | B2 | 6/2006 | Bryan, III |
| 7,069,691 | B2 | 7/2006 | Brooke et al. |
| 7,171,782 | B2 | 2/2007 | Felknor et al. |
| 8,776,433 | B2 | 7/2014 | Huang et al. |
| 9,622,427 | B2 | 4/2017 | Wagner |
| D785,497 | S | 5/2017 | Storey |
| D795,129 | S | 8/2017 | Dillard |
| D796,378 | S | 9/2017 | Storey |
| 9,850,658 | B2 | 12/2017 | Alcala |
| 10,080,336 | B2 | 9/2018 | Higgins |
| 2002/0005013 | A1 | 1/2002 | Taylor |
| 2003/0089037 | A1 | 5/2003 | Ware |
| 2006/0032128 | A1 | 2/2006 | Morris |
| 2007/0144069 | A1 | 6/2007 | Gottlieb |
| 2010/0132255 | A1 | 6/2010 | Webber |
| 2010/0146854 | A1 | 6/2010 | Cannon |
| 2011/0067301 | A1 | 3/2011 | DeMitchell et al. |
| 2012/0167460 | A1 | 7/2012 | Omidi |
| 2012/0279126 | A1 | 11/2012 | Simmons |
| 2012/0291349 | A1 | 11/2012 | Teng et al. |
| 2013/0118074 | A1 | 5/2013 | Fulbrook |
| 2014/0083007 | A1 | 3/2014 | Galvin |
| 2015/0000189 | A1 | 1/2015 | Greis-Avnon |
| 2015/0223418 | A1 | 8/2015 | Collins et al. |
| 2015/0296726 | A1 | 10/2015 | Higgins |
| 2015/0300011 | A1 | 10/2015 | Lopez |
| 2016/0050863 | A1 | 2/2016 | Graber |
| 2016/0353674 | A1 | 12/2016 | Keats |
| 2017/0105372 | A1 | 4/2017 | Bryan |
| 2017/0202161 | A1 | 7/2017 | Echert |
| 2017/0339854 | A1 | 11/2017 | Van der Merwe |
| 2017/0347545 | A1 | 12/2017 | Van der Merwe |
| 2018/0001447 | A1 | 1/2018 | Lam et al. |
| 2018/0098516 | A1 | 4/2018 | Van Buuren et al. |

FOREIGN PATENT DOCUMENTS

| | | |
|---|---|---|
| CN | 104206199 | 12/2014 |
| EP | 3261431 | 1/2018 |
| EP | 3264883 | 1/2018 |
| JP | S 52157437 | 11/1977 |
| JP | S 52163538 | 12/1977 |
| JP | H01-003540 | 1/1989 |
| JP | H01-104117 | 4/1989 |
| JP | H 01112653 | 7/1989 |
| JP | H05-276997 | 10/1993 |
| JP | H06-005549 | 1/1994 |
| JP | 2639130 | 8/1997 |
| JP | 2000217449 | 8/2000 |
| JP | 2001095385 | 4/2001 |
| JP | 2004-154084 | 6/2004 |
| JP | 2016214194 | 12/2016 |
| JP | A 2018-513695 | 5/2018 |
| TW | 492607 | 1/2015 |
| WO | WO 2014084702 | 6/2014 |
| WO | WO 2016/162856 | 10/2016 |

OTHER PUBLICATIONS

Examination issued in Corresponding European Application No. 16717710.4, dated Jun. 24, 2021.

Examination Report issued in Corresponding Malaysian Application No. PI 2017703810, dated Jun. 1, 2021 (English translation provided).

International Preliminary Report on Patentability issued in Corresponding PCT application PCT/IB2019/055702, dated Sep. 17, 2020.

International Preliminary Report on Patentability issued in PCT Application No. PCT/IB2016/052043, issued Oct. 10, 2017.

International Search Report and Written Opinion issued in corresponding International Patent Application No. PCT/IB2019/055702, dated Oct. 23, 2019, 13 pages.

International Search Report and Written Opinion issued in PCT Application No. PCT/IB2016/052043, issued Sep. 8, 2016.

Office Action Issued in Chinese Patent Application No. 201680033504.0, dated Nov. 28, 2019.

Office Action issued in Corresponding Brazilian Application No. BR 12 2019 027782.6, dated May 26, 2021. (English translation provided).

Office Action Issued in Corresponding European Patent Application No. P 16717710.4, dated Sep. 17, 2020.

Office Action issued in Corresponding Indian Application No. 201717039838, dated Jan. 27, 2021.

Office Action issued in Corresponding Singapore Application No. 11201708315S, dated May 14, 2021.

Office Action Issued in Japanese Patent Application No. 2018-503838, dated Feb. 27, 2020. (Machine Translation in English).

Written Opinion and Search Report issued in corresponding Singapore Application No. 11292100086V, dated Sep. 20, 2022.

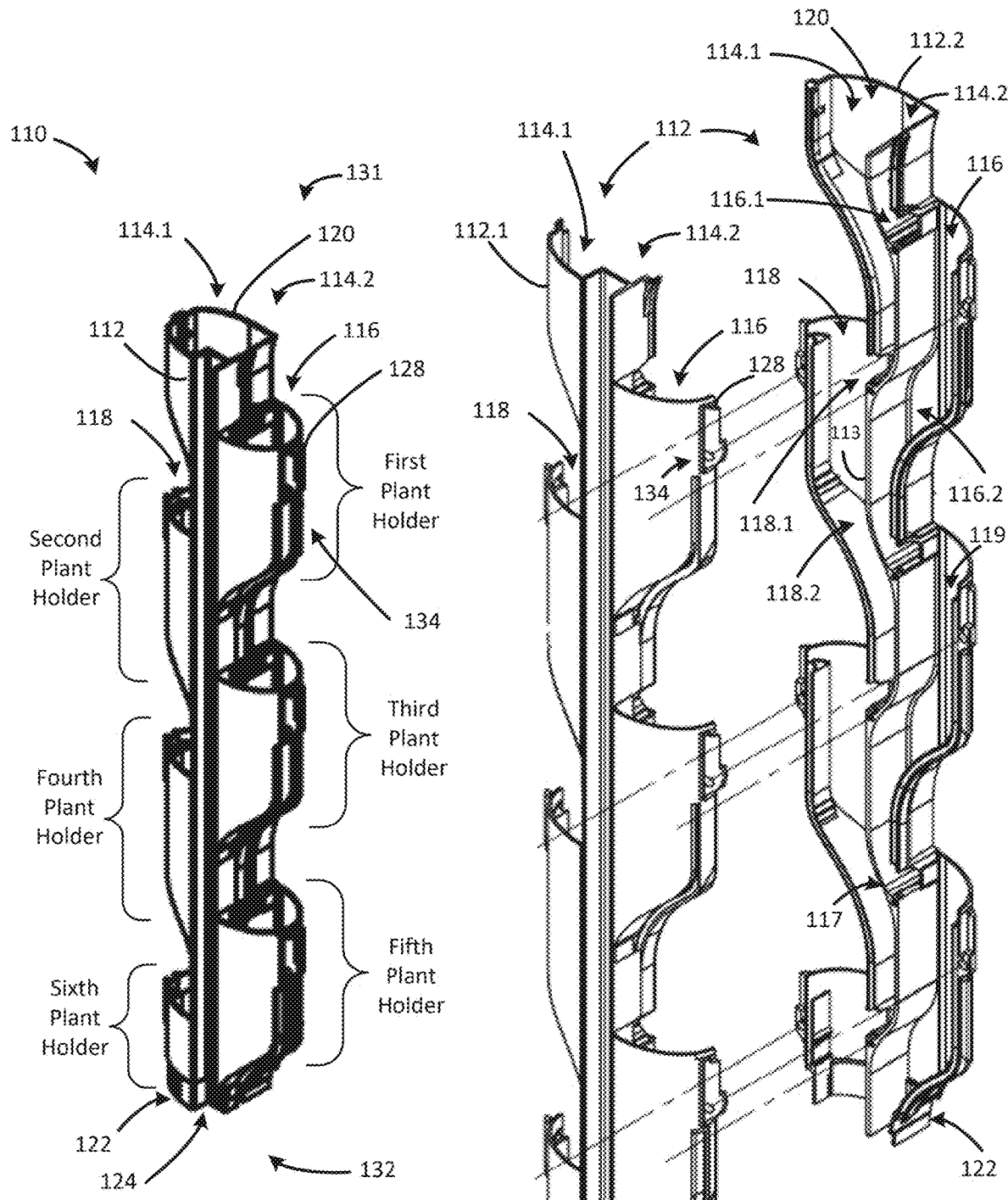

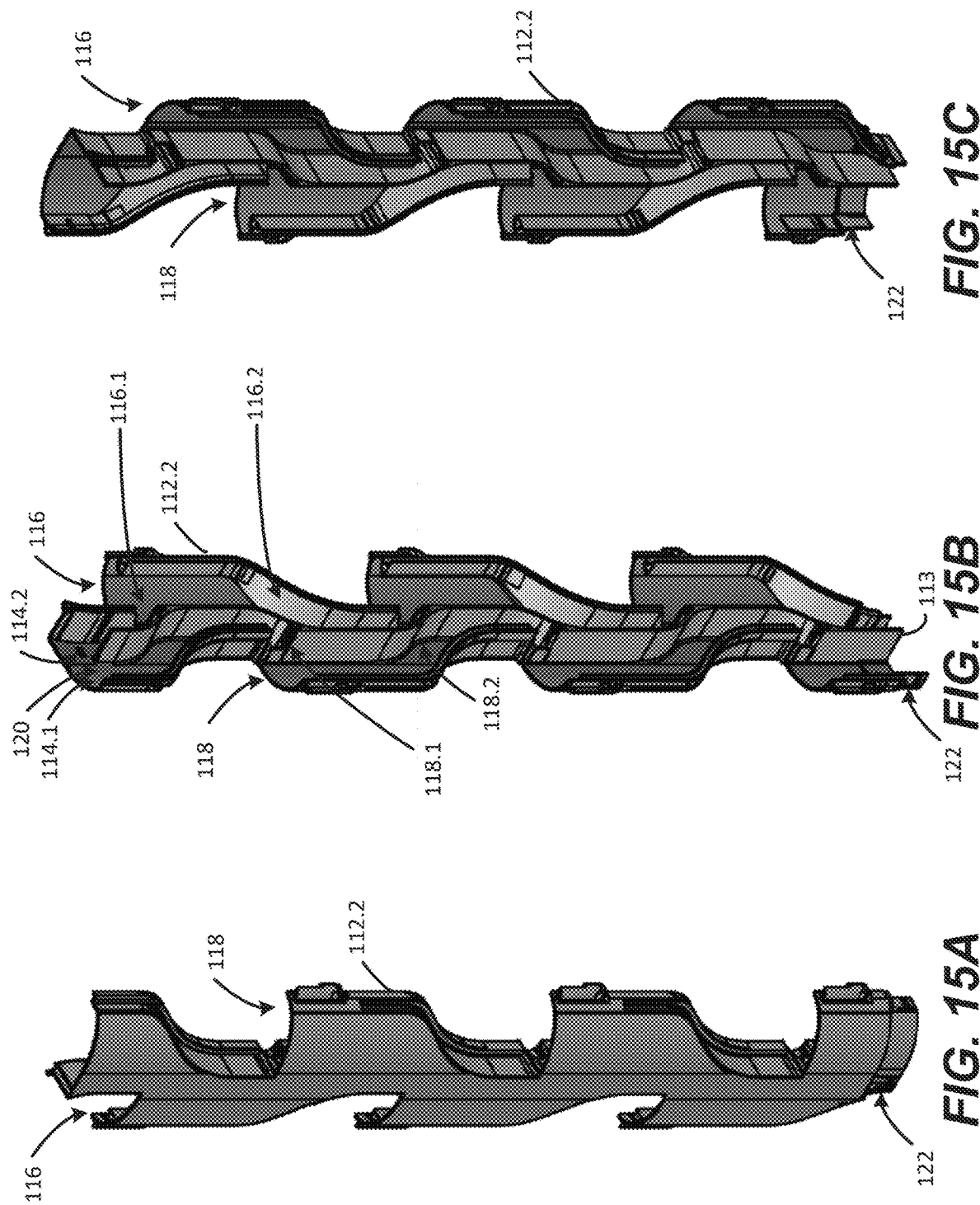

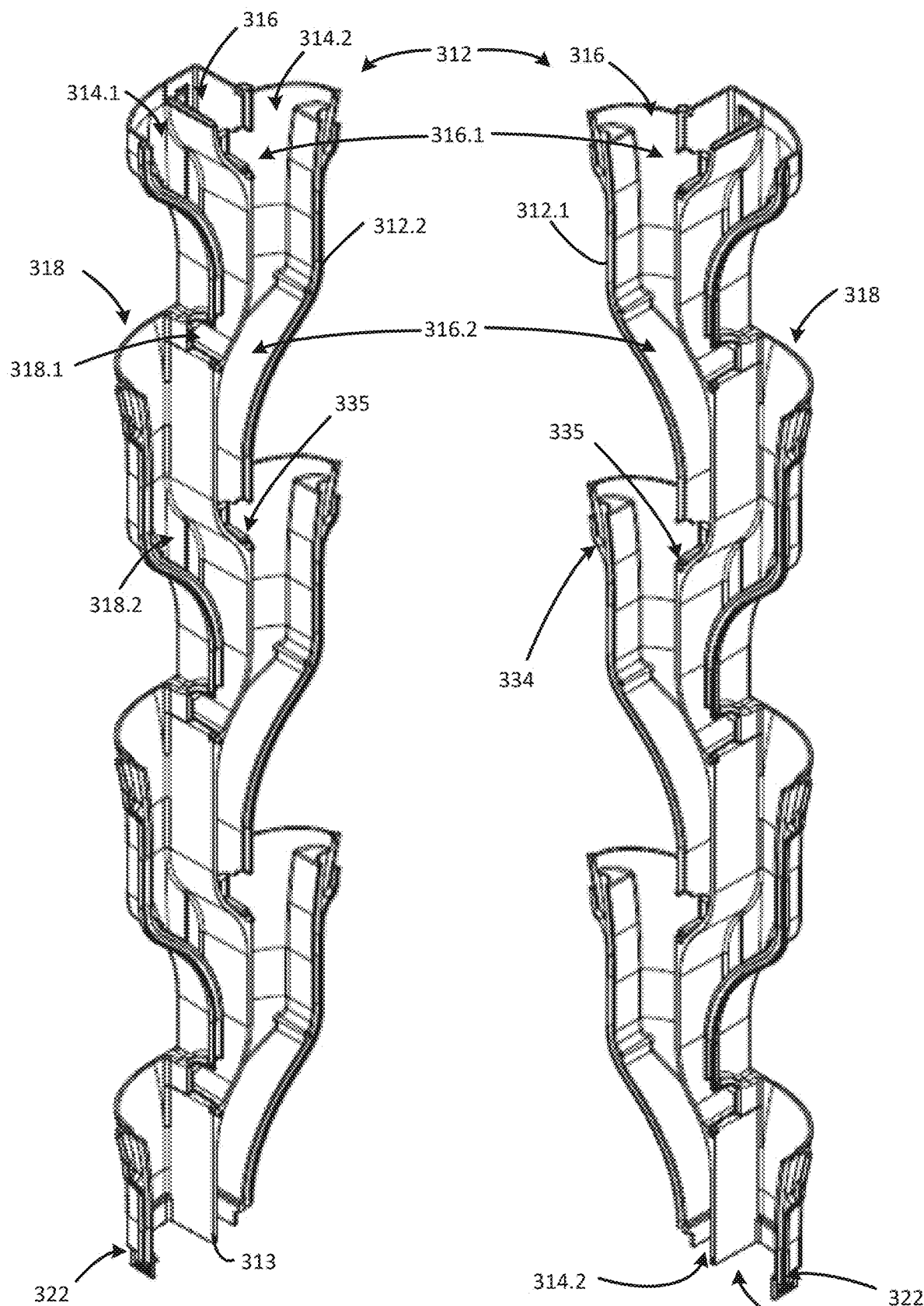
*FIG. 27A*  *FIG. 27B*

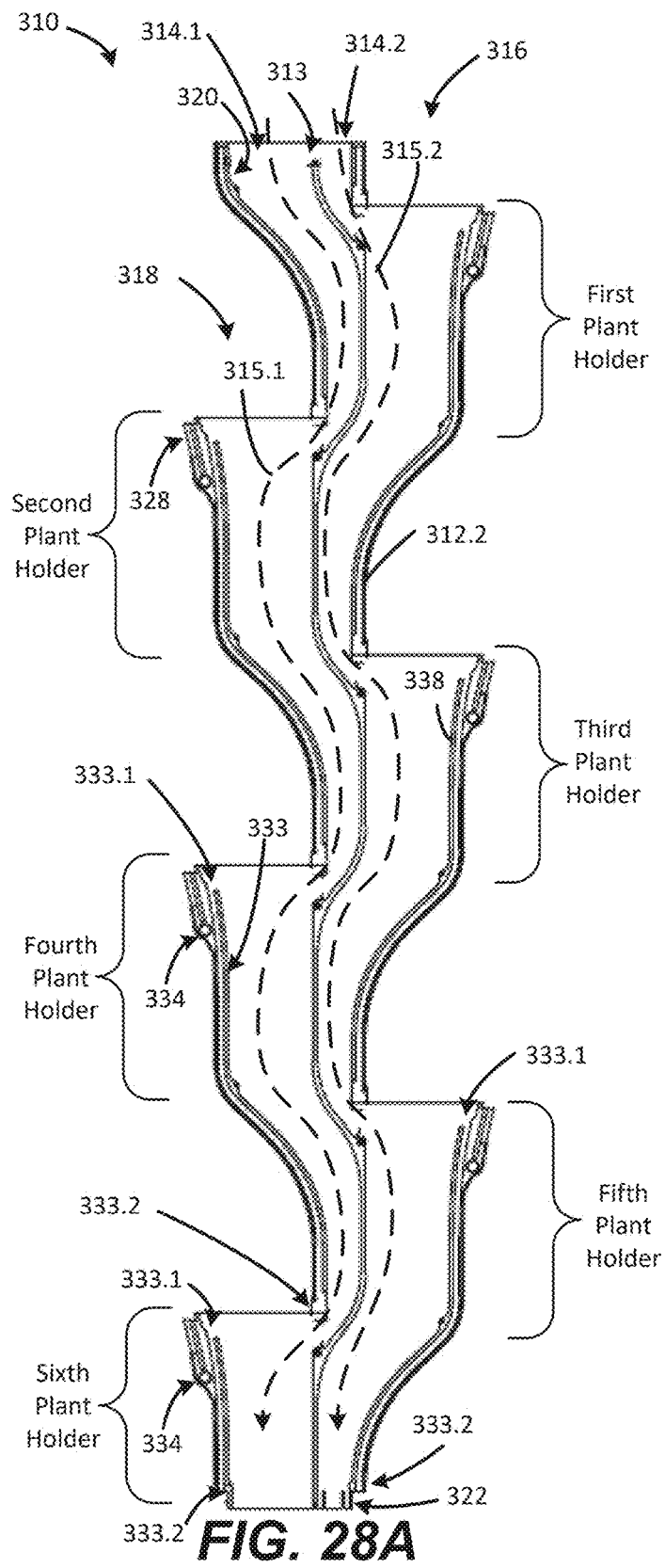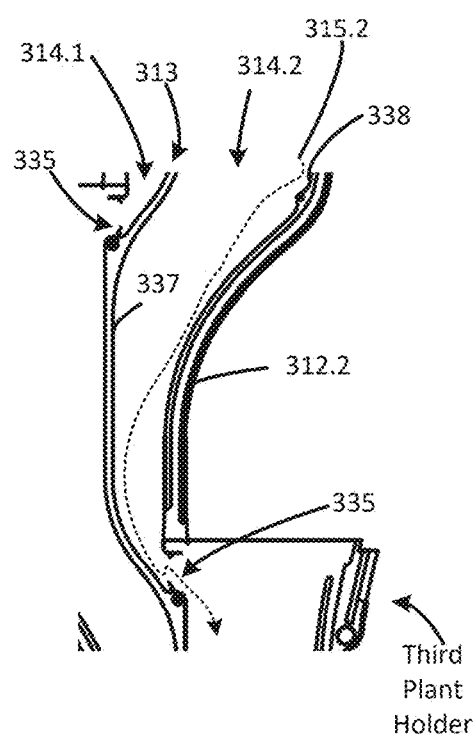
FIG. 28A
FIG. 28B

HYRDOPONICS

CROSS-REFERENCE TO RELATED APPLICATIONS

The present application is a continuation of U.S. application Ser. No. 16/503,209, filed Jul. 3, 2019, which claims benefit of U.S. Provisional Application No. 62/694,760 filed Jul. 6, 2018, which are incorporated by reference herein in their entireties.

TECHNICAL FIELD

The present disclosure relates generally to a planter and/or a hydroponics, and, but not by way of limitation, to devices, systems, and methods related to a planter, a planter tower, and/or a hydroponic greenhouse.

BACKGROUND

Conventional planters include a variety of sizes and shapes. In a conventional planter, the planter and/or one or more plants grown in the planter may be prone to grow into the planter. In situations where the plant grows into the planter, damage can occur to the plant, harvesting of the plant is cumbersome and can damage the plant and/or the planter, or both. Additionally, or alternatively, in a conventional planter in which multiple plants can be grown, the planter and/or the plants may be prone to have two or more plants grow into each other and getting attached to each other in the planter. When two or more plants grow into each other, harvesting of plants from the planter becomes cumbersome, can damage one or more of the plants (e.g., damage a root system, a stem, etc.), damage to the planter can occur, or a combination thereof. Situations where plants grow into a planter and/or into each other can happen in high density situations where multiple plants are grown in relatively close proximity to each other, which can compromise growth and/or a yield (e.g., a harvest) of the plants.

Additionally, conventional planters may not be designed to efficiently use resources, such as water, which results in waste of resources and added costs. For example, a conventional planter may not have adequate drainage for liquids (e.g., water) which can results in a backup condition in which water overflows from the planter creating waste as well as a hazardous condition (e.g., a safety issue) when water overflows onto a floor. As another example, conventional planters may not be designed to promote growth of plants. For example, a conventional planter may not account for, be adaptable to, and/or be configurable to (e.g., customizable) to multiple growing environments or specific plant requirements.

SUMMARY

The present disclosure describes a planter, a plant tower, and a greenhouse that includes a planter having a longitudinal body defining at least two longitudinally extending liquid channels, the longitudinal boding including one or more mounting ports configured to enable coupling of a conduit to the longitudinal body; and at least two plant holders defined in the body, the plant holders spaced on the outer circumference of the longitudinal body, each one of the at least two plant holders in fluid flow communication with one of the at least two longitudinally extending liquid channels. In some implementations, the planter includes a mounting bracket coupled to the mounting port, the mounting bracket including a post configured to engage the mounting port and one or more coupling elements configured to secure a conduit. Additionally, or alternatively, the planter may include the conduit coupled to and longitudinally extending along the longitudinal body, the conduit having outlets spaced along its length, the conduit optionally including one or more grooves configured to engage a portion of the longitudinally body or a portion of the one or more coupling elements.

In some implementations, the longitudinal body further defining an overflow conduit having an inlet associated with the first plant holder and an outlet posited below the inlet. Additionally, or alternatively, each plant holder includes an inlet opening and an outlet opening, which is in flow communication with its corresponding liquid channel; and a ridge is positioned adjacent to the inlet opening, the ridge extending at least partially along a length of the inlet opening.

According to one aspect of the disclosure there is provided a planter which includes a longitudinal body defining at least two longitudinally extending liquid channels; and at least two plant holders defined in the body, the plant holders spaced on the outer circumference of the longitudinal body, each one of the at least two plant holders in fluid flow communication with one of the at least two longitudinally extending liquid channels.

The longitudinal body may include a single longitudinal conduit which is internally divided to define the at least two longitudinally extending liquid channels.

Each planter holder may define a holder mouth into which plants are receivable. In particular the holder mouth may be shaped as an applanated cylindrical ellipse,-circle or the like.

In one embodiment, the at least two plant holders may be located on opposed sides of the longitudinal body. In particular, the at least two plant holders may be alternatively spaced on opposed sides over the length of the longitudinal body.

Each of the plant holders may be in fluid flow communication with a different one of the longitudinally extending liquid channels.

The longitudinal body may include connecting formations at the ends of the longitudinal body.

The connecting formations may be shaped and dimensioned to fit into corresponding connection formations of corresponding planters.

The operative lower end of the longitudinal body of the planter may have a connection formation for fitting into a corresponding connection formation on an operative upper end of a longitudinal body of a corresponding planter installed below the former planter, and the operative upper end of the longitudinal body of the planter may have a connection formation for fitting into a corresponding connection formation on an operative lower end of a longitudinal body of a corresponding planter installed above the former planter.

In one embodiment the connecting formations may be in the form of socket and spigot formations shaped and dimensioned to fit into respective spigot and socket formations of corresponding planters.

The operative lower end of the longitudinal body of the planter may have a spigot formation, for fitting into a socket formation on an operative upper end of a longitudinal body of a corresponding planter installed below the former planter and the operative upper end of the longitudinal body of the planter may have a socket formation for receiving a spigot formation on an operative lower end of a longitudinal body of a corresponding planter installed above the former planter.

In an opposed example, the operative lower end of the longitudinal body of the planter may have socket formation, for receiving a spigot formation on an operative upper end of a longitudinal body of a corresponding planter installed below the former planter and the operative upper end of the longitudinal body of the planter may have a spigot formation for fitting into a socket formation on an operative lower end of a longitudinal body of a corresponding planter installed above the former planter.

Each plant holder may include an inlet opening and an outlet opening, which is in flow communication with its corresponding liquid channel. In particular the inlet opening may be located above the outlet opening to permit gravitational liquid flow into the plant holder through the inlet opening and liquid flow from the plant holder through the outlet opening.

The planter may include at least one longitudinally extending gas channel, the gas channel having gas outlets spaced along its length. The gas outlets may open to the outside of the planter body. The gas outlets may be in the form of nozzles.

The connecting formations may be shaped and dimensioned to connect adjacent planter bodies together. The connecting formations may include liquid channel connecting formations for connecting the liquid channels of adjacent planter bodies together. The connecting formations may include gas channel connecting formations for connecting the gas channels of adjacent planter bodies together.

The planter may include an external attachment formation proximate the plant holder mouth for attaching plant supports. In particular, the attachment formation may be located below the plant holder mouth and may receive various types of plant supports, such as a creeper trellis and the like. In this embodiment, the creeper trellis may be arranged to support a creeper plant, planted in the plant holder when it grows from the plant holder mouth.

The external attachment formation may further be supportive of lighting means, proximate the plant leaves for enhancing lighting onto the plant and subsequent plant growth. The lighting means may be in the form of light emitting diodes (LED's) operable to emit a specific frequency of light.

The planter may further include planting inserts shaped and dimensioned to fit into mouths of the at least two plant holders.

The planting inserts may be selected from any one or more of: a seedling tray, a planting tray, a seeding clip and the like.

The seedling tray may be in the form of a cylindrical body, shaped to the shape of the plant holder. The seedling tray may have a depth of about 43 mm. The seedling tray may include an inlet opening indexed with the inlet opening of the plant holder. The seedling tray may include a planar base cut in sections to provide drainage slits. The drainage slits may be less than 0.5 mm in width to permit liquid drainage without flushing seedlings from the seedling tray.

The planting tray may be in the form of a cylindrical body shaped to the shape of the plant holder. The planting tray may have a depth of about 117 mm. The planting tray may include an inlet opening indexed with the inlet opening of the plant holder. The planting tray may include a planar base cut in sections to provide drainage slits. A portion of the planting tray sidewall may also include drainage slits. The portion of the sidewall may be slightly tapered towards the base. The drainage slits may be less than 0.5 mm in width to permit liquid drainage without flushing seedlings from the seedling tray.

The seeding clip may have a planar body for closing the planter mouth and provided with a downwardly projecting plate having a slot shaped to engage the stem of a plant.

According to another aspect of the disclosure, there is provided a planter tower, which includes a plurality of planters as described, connected together to form an elongate upright planter with plant holders extending from the sides of the planter tower.

The planter tower may include between eight and sixteen planters connected together.

The planter tower may include at least one end member, shaped and dimensioned to connect onto an end the plurality of planters connected together.

Specifically the planter tower may include two end members, a top end member for connecting to the top end of the plurality of planters and a bottom end member for connecting to the bottom end of the plurality of planters.

The at least one end member may be shaped to fit onto an end of a longitudinal body of a planter, socket and spigot fashion.

The at least one end member may include dual liquid conduits indexed to match the longitudinally extending liquid channels.

The at least one end member may include a gas conduit indexed to match a gas channel extending through the planters.

The at least one end member may include a body with two sides, one of which is provided with a socket formation and one of which is provided with a spigot formation for fitting onto matched spigot and socket formations of the ends of the longitudinal body.

The top end member may be in the form of an intake closure attached at a top end of a plurality of inter-connected planters for directing liquid into the two longitudinally extending liquid channels and for directing gas into the at least one longitudinally extending gas channel.

The bottom end member may be in the form of an outlet closure attached at a bottom end of a plurality of inter-connected planters for directing liquid from the two longitudinally extending liquid channels and for directing gas from the at least one longitudinally extending gas channel.

The at least one end member may include a catchment tray, for receiving any overflow liquid.

The liquid channels may extend over the length of the interconnected planters.

Each planter in the planter tower may include a gas channel, the gas channel extends over the length of the inter-connected planters.

According to another aspect of the disclosure, there is provided a hydroponic greenhouse, which includes an array of planter towers, the planter towers arranged in parallel spaced rows, the rows being provided with a top liquid and gas supply line, connected via an intake closure to a top of each of the planter towers, the rows further being provided with a bottom liquid and gas collection line, connected via an outlet closure to a bottom of each of the planter towers; a liquid circulation system, connected to the liquid supply lines and the liquid collection lines; a gas circulation system, connected to the gas supply lines and the gas collection lines.

In an embodiment where the gas outlets, described above, are directed to the outsides of the planter bodies, the gas outlets may be directed at plants in an adjacent planter tower, advantageously to provide an adequate exchange of gas on the leaves of an adjacent plant.

The greenhouse may include a partially closed enclosure, which may be provided with any one or more of air conditioners, high pressure fans, dampers, coiled coolers for recirculation of the liquid or gas from the liquid collection lines to the liquid supply lines or alternatively gas supply lines, geothermal heater/coolers, heat pumps, humidity controllers, infra-red controllers, and the like.

The greenhouse may be provided with a nutrient supply dosing pump connected to the liquid circulation system for dosing nutrients into the liquid circulation system.

The greenhouse may further include a filtering arrangement connected to the liquid circulation system for filtering the liquid in the liquid circulation system.

The present disclosure beneficially improves planting density without compromising growth. The present disclosure also beneficially enables efficiently use resources, such as water, which results in waste of resources and added costs. To illustrate, the overflow channels may enable water to not be wasted, one or more ridges may enable better coverable of water into a plant holder, and/or the mounting ports may enable efficient placement of and delivery of gas, as illustrative, non-limiting examples.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "or" is used to refer to a nonexclusive "or" unless otherwise indicated.

The term "about" as used herein can allow for a degree of variability in a value or range, for example, within 10%, within 5%, or within 1% of a stated value or of a stated limit of a range, and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. The phrase "at least one of A and B" has the same meaning as "A, B, or A and B."

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z." unless indicated otherwise.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments. In the methods described herein, the acts can be carried out in any order, except when a temporal or operational sequence is explicitly recited. Furthermore, certain acts can be carried out concurrently even if described as being carried out sequentially. In addition, it is to be understood that the phrascology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

Some details associated with the embodiments are described above, and others are described below. Other implementations, advantages, and features of the present disclosure will become apparent after review of the entire application, including the following sections: Brief Description of the Drawings, Detailed Description, and the Claims.

DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIGS. 13A to 13E show views associated with an example of a planter;

FIGS. 15A to 15C show three-dimensional views of an example of a portion of a planter;

FIGS. 27A and 27B illustrate two halves of the planter of FIGS. 26A and 26B;

FIG. 28A shows a side view of a portion of the planter of FIG. 26A;

FIG. 28B shows zoomed in view of a portion of the side view of the planter shown in FIG. 28A;

DETAILED DESCRIPTION

Figure 1B:
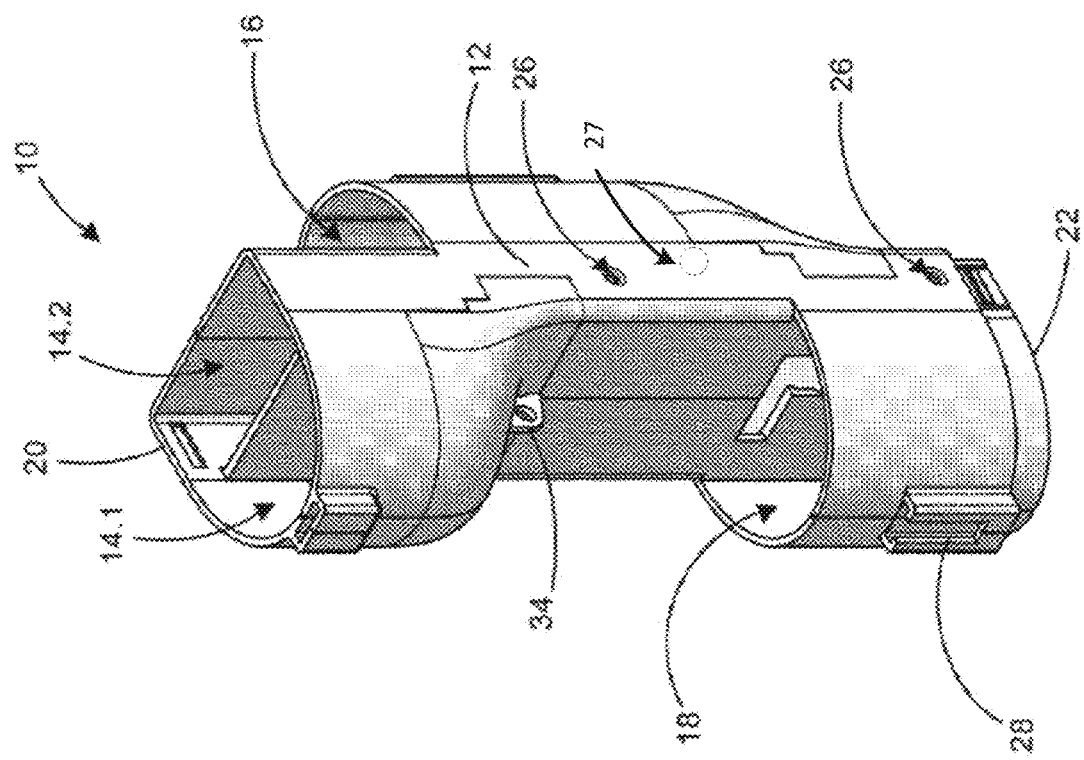
FIGS. 1A and 1B show three-dimensional views of a planter in accordance with one aspect of the disclosure.
Figure 1A:
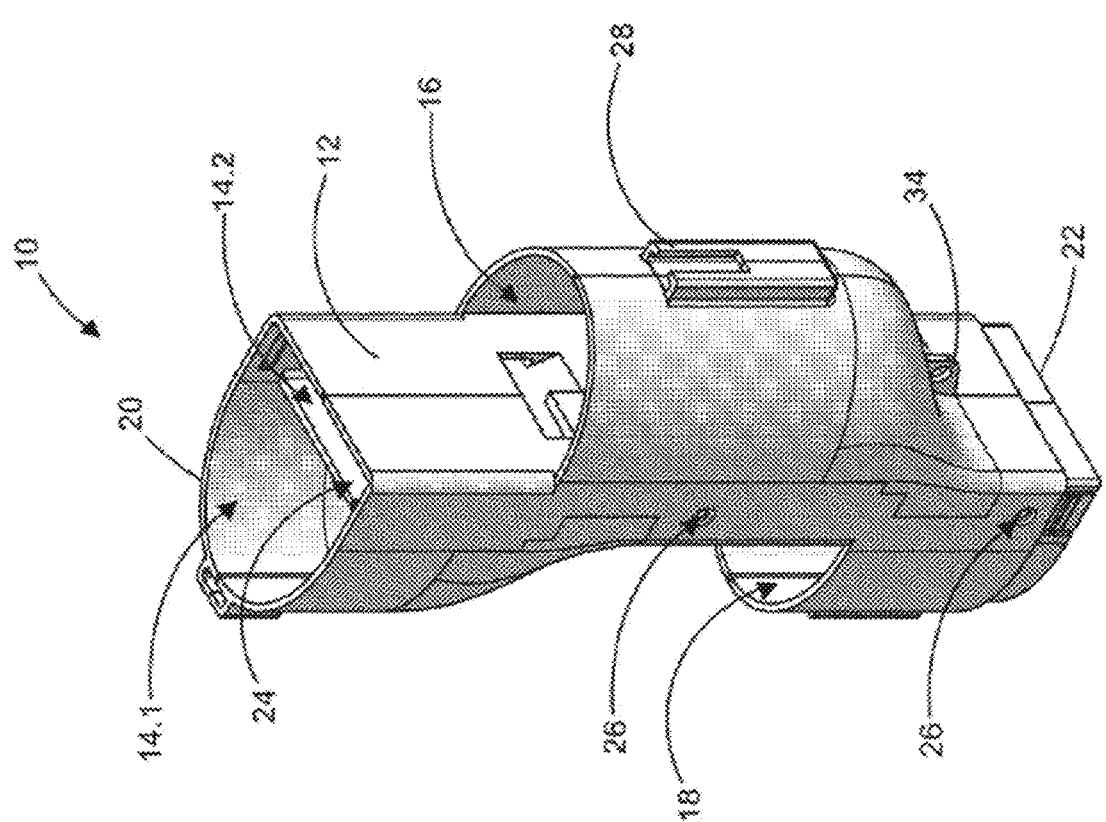
Figures 2A, 2B:
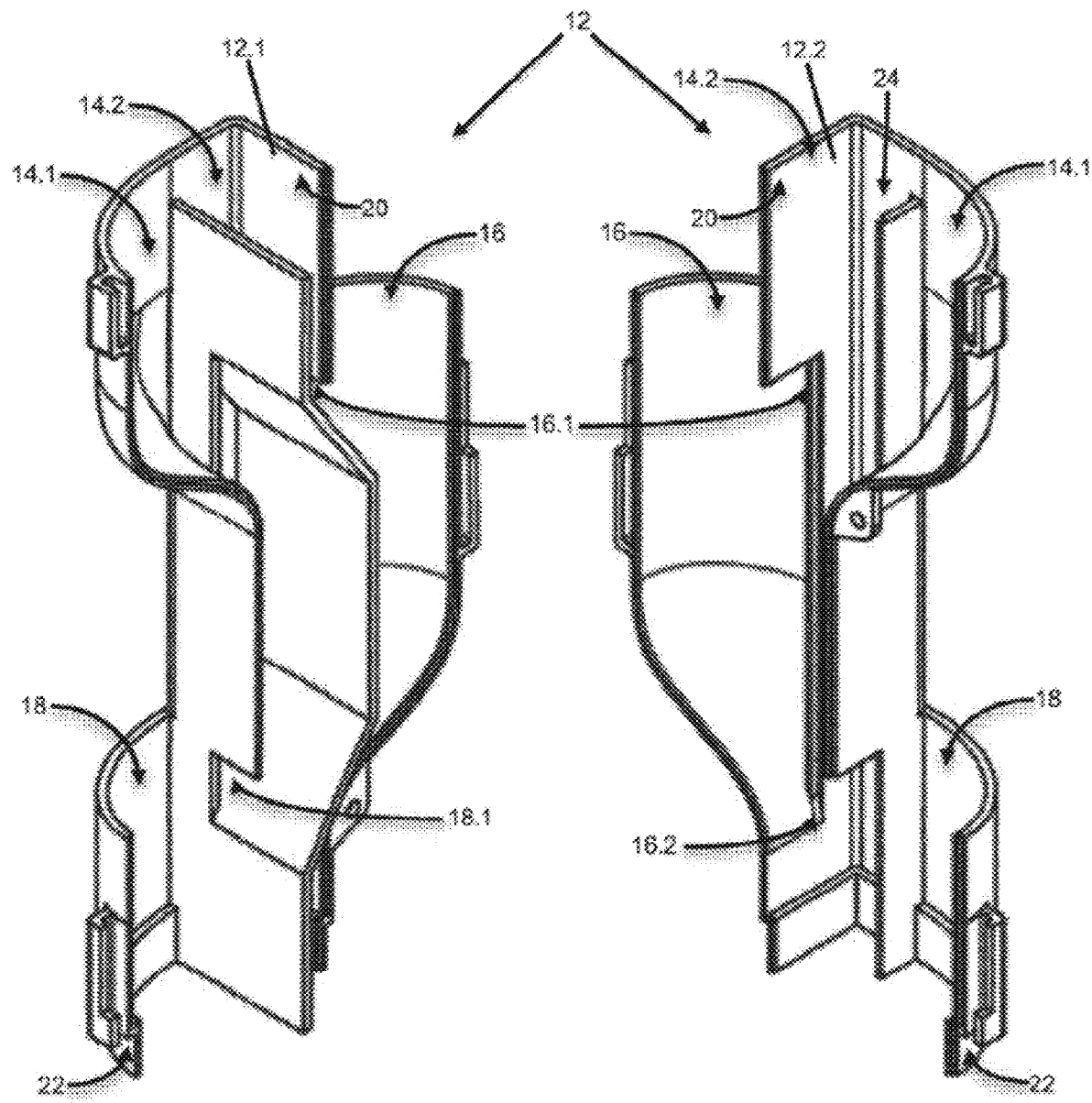
FIGS. 2A and 2B show two halves of the planter of FIGS. 1A and 1B.

In FIGS. 1A and 1B, a planter 10, in accordance with at least one aspect, is shown. The planter 10 has a longitudinal body 12, in two halves 12.1 and 12.2, as shown in FIGS. 2A and 2B. The planter 10 includes a first end 31 and a second end 33 that is opposite the first end 31.

The longitudinal body 12 defines two longitudinally extending liquid channels 14.1 and 14.2 as shown in FIGS. 1A, 1B, 2A, 2B, and 3. For example, a first liquid channel 14.1 extends between the first end 31 to the second end 33 and a second liquid channel 14.2 extends between the first end 31 and the second end 33. The first liquid channel 14.1 is distinct from the second liquid channel 14.2. To illustrate, the longitudinal body 12 may include a single longitudinal conduit which is internally divided (by a divider 13) into the at least two longitudinally extending liquid channels 14.1 and 14.2.

The planter 10 includes two plant holders 16, 18 defined on the outer circumference of the longitudinal body. As can be seen in at least FIGS. 2A and 2B, the two plant holders 16, 18 have openings 16.1, 18.1 defining liquid inlets to the plant holders and openings 16.2, 18.2 defining liquid outlets from the plant holders. As shown in FIGS. 2A and 2B, the opening 18.2 (e.g., the liquid outlet) of the plant holder 18 may include or correspond to an opening associated with the second end 33. Alternatively, the opening 18.2 (e.g., the liquid outlet) of the plant holder 18 may be positioned as shown with reference to at least FIG. 5.

As can be seen in at least FIGS. 1A, 1B, 2A, and 2B, the plant holders 16, 18 have holder mouths in the form of applanated cylindrical ellipses.

As can be seen in at least FIGS. 1A, 1B, 2A, and 2B, the two plant holders 16, 18 are alternatively spaced on opposed sides of the longitudinal body. For example, plant holder 16 may correspond to a first plant holder and plant holder 18 may correspond to a second plant holder.

In FIGS. 1A, 1B, 2A, and 2B, it can be seen that the longitudinal body has connecting formations 20, 22 in the form of socket and spigot formations at the ends of the longitudinal body 12. As can be seen in at least FIGS. 4 and 5, the connecting formations are shaped and dimensioned to fit into respective spigot and socket formations of corresponding planters. For example, the operative lower end of the longitudinal body 12 of the planter 10 has a spigot formation 22, for fitting into a socket formation 20 on an operative upper end of a longitudinal body 12 of a corresponding planter 10 installed below the former planter. To illustrate, as shown in FIG. 5, formations 20, 22 are coupled together at an interface 68.

Figure 3:
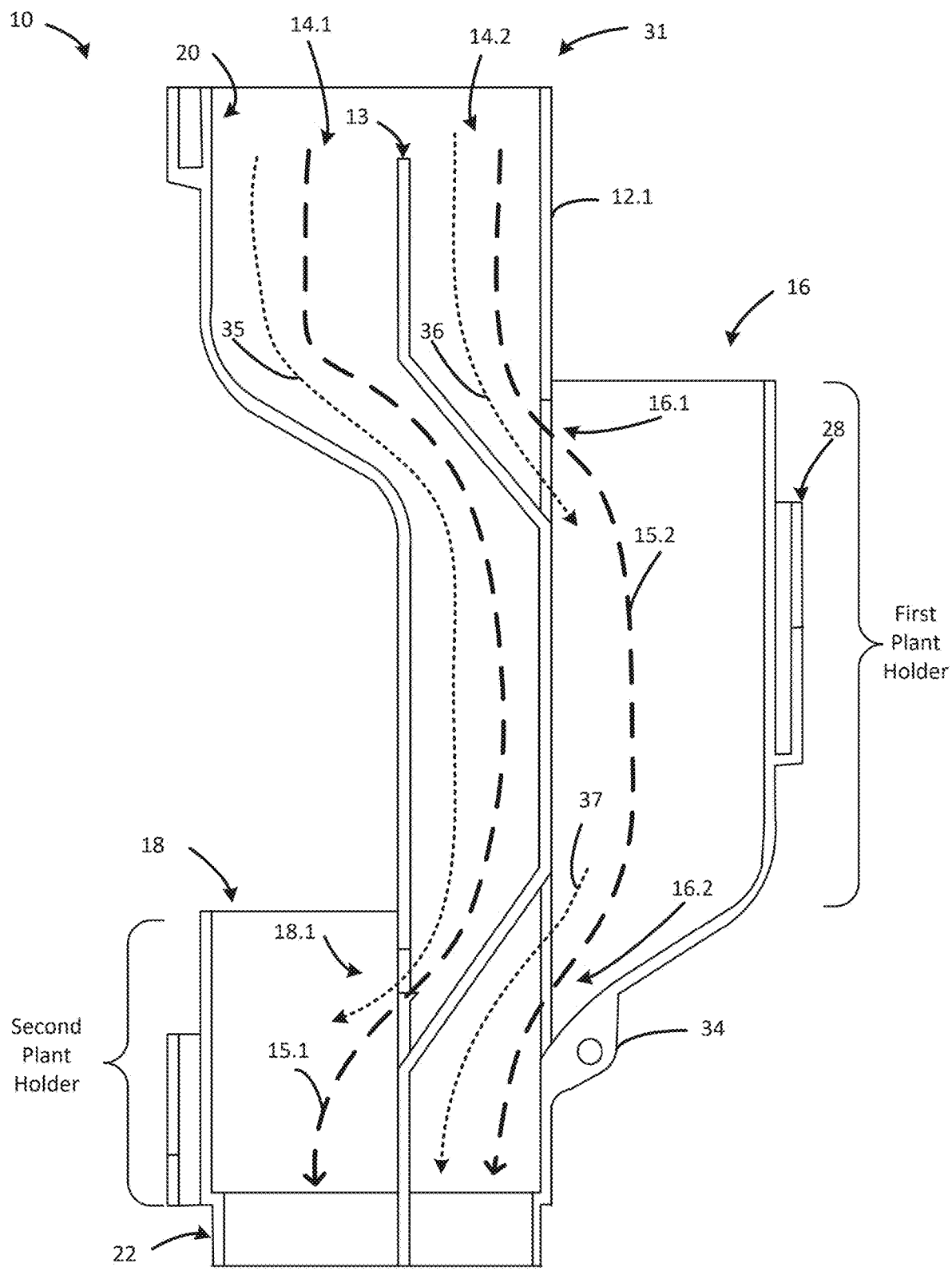
FIG. 3 shows a side view of a portion of the planter of FIG. 1A.
Figure 5:
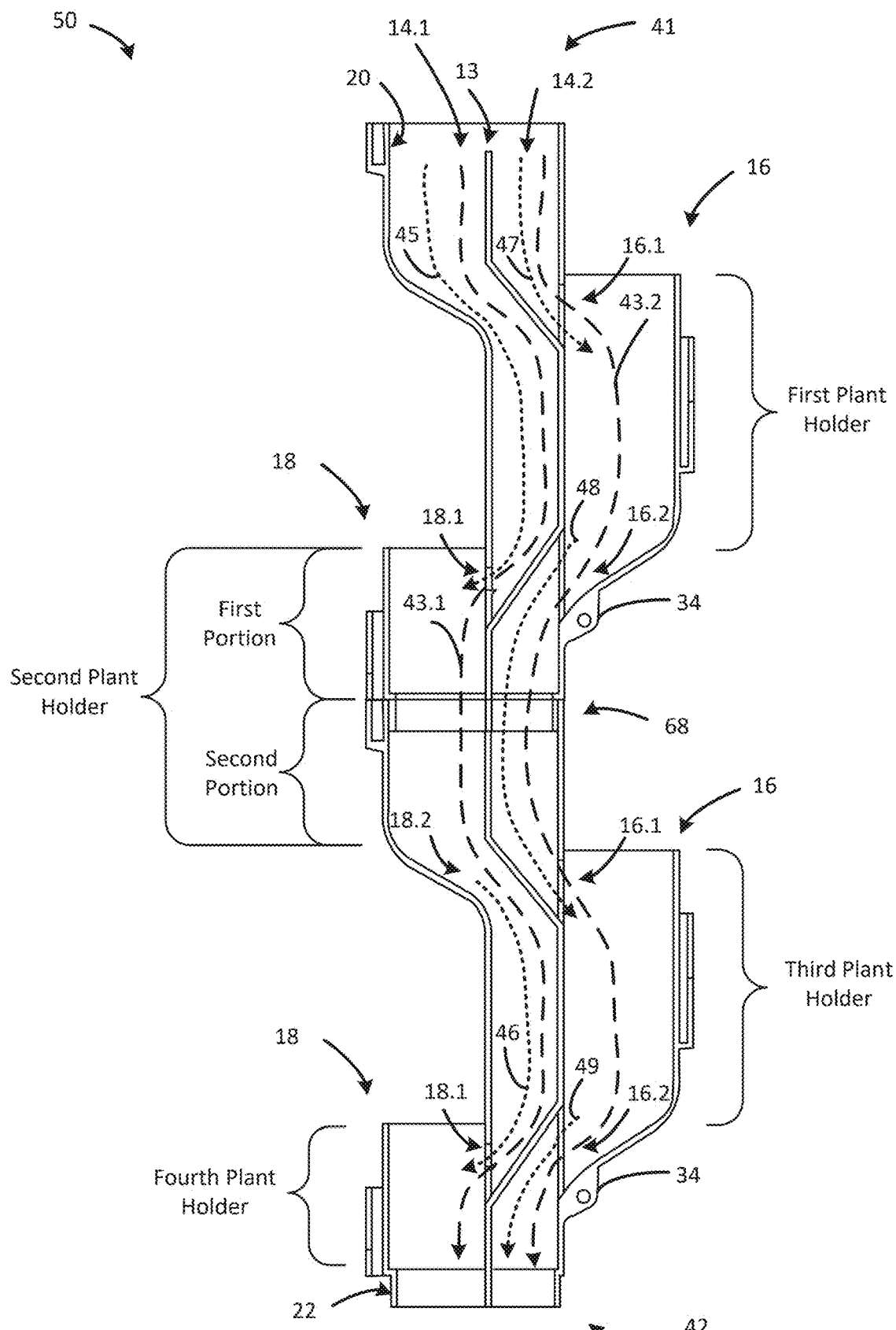
FIG. 5 shows a side view of a portion of the planter tower of FIG. 4.

As can be seen in at least FIGS. 2A, 2B, and 5, each plant holder 16, 18 has an inlet opening 16.1, 18.1 and an outlet opening 16.2, 18.2, respectively, which forms part of its corresponding liquid channel 14.2 and 14.1, respectively. As can be seen, the inlet openings 16.1, 18.1 are located above the outlet openings 16.2, 18.2 to permit liquid to flow into the plant holders 16, 18 through the inlet openings 16.1, 18.1 and from the plant holder through the outlet opening 16.2, 18.2. Referring to FIG. 3, the first fluid channel 14.1 and second fluid channel 14.2 may corresponds to and/or define fluid paths 15.1, 15.2, respectively, between first end 31 and second end 33. Fluid path 15.1 may include at least a first fluid path 35 between first end 31 and opening 18.1. Fluid path 15.2 may include at least a second fluid path 36 between first end 31 and opening 16.1 and a third fluid path 37 between opening 16.2 and second end 33.

As can be seen in FIGS. 2A and 2B, each plant holder 18 comprises two halves, which defines a complete plant holder, when connected to each other.

Figure 11:
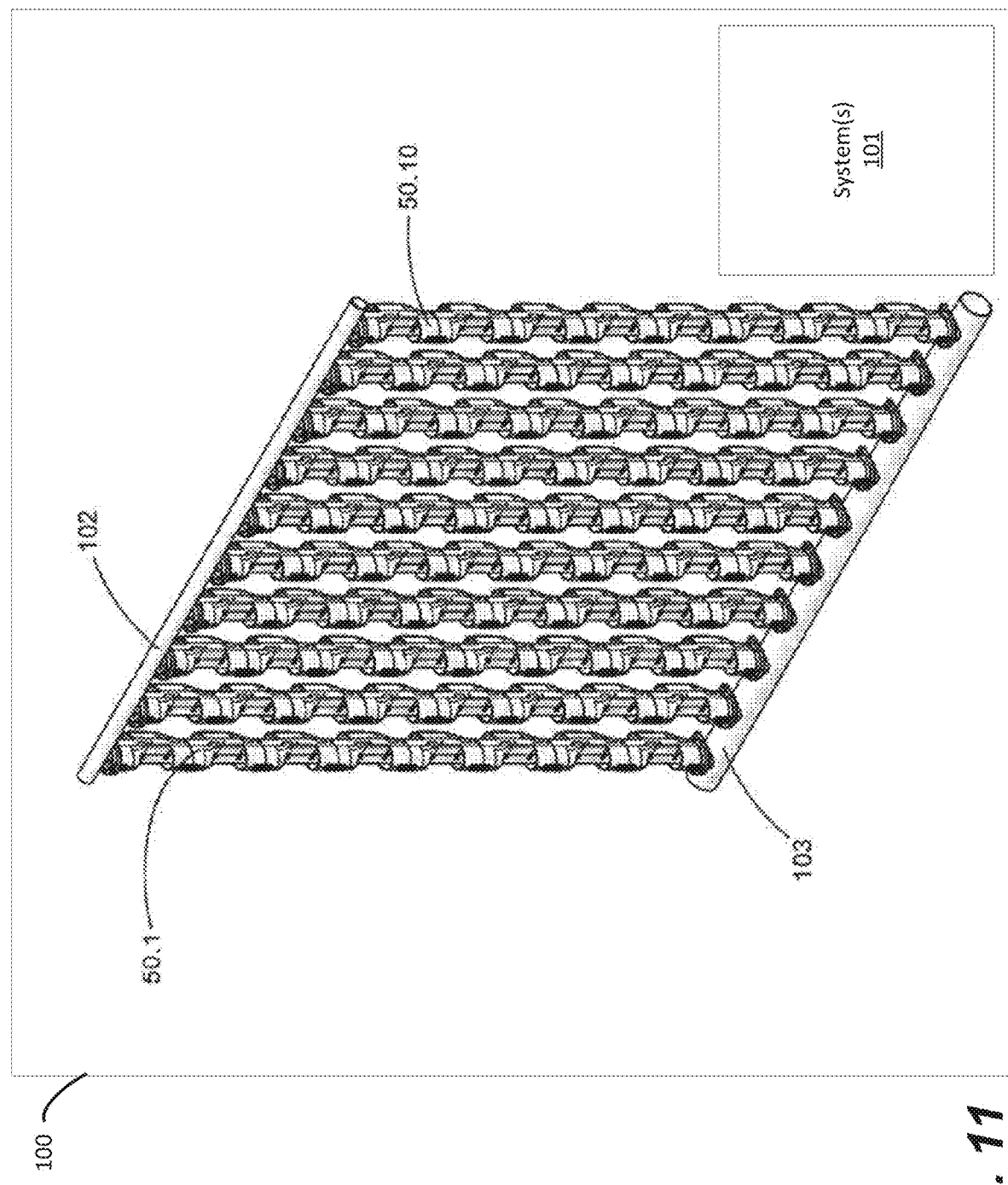
FIG. 11 shows a hydroponic greenhouse in accordance with a further aspect of the disclosure.

The planter 10 further includes a longitudinally extending gas channel 24. The gas channel 24 has outlets spaced along its length. In particular, the gas channel 24 has outlets 26 that open to the outside of the planter body 12 (see FIG. 4). The gas outlets 26 are in the form of nozzles, when the planters are assembled in an array as shown in FIG. 11, the nozzles are directed at plants in adjacent planter towers, to ensure adequate gas exchange on the leaves of those plants. The gas channel may be integrated into the longitudinal body, as shown in at least FIGS. 1A and 1B, or may be coupled to the longitudinal body, as described with reference to at least FIGS. 25A and 25B. Additionally, or alternatively, the longitudinal body may include one or more mounting ports (e.g, 27 represented as with dashed line) configured to enable a conduit (e.g., a gas conduit, a liquid conduit, and/or other conduit) to be coupled to planter 10, as descried at least with reference to FIG. 26B.

Figure 9:
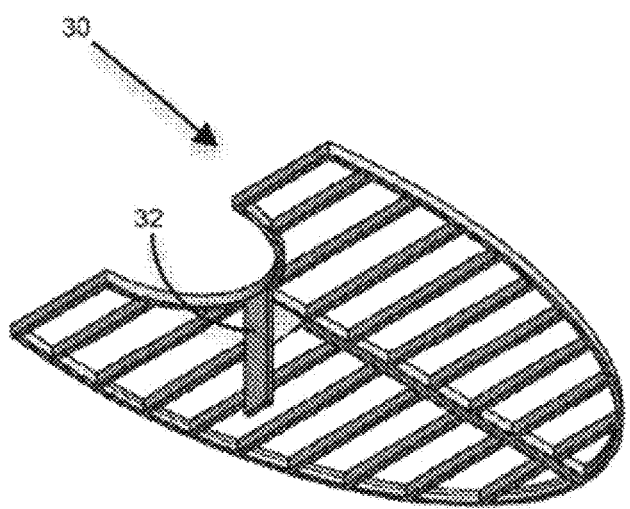
FIG. 9 shows a creeper trellis of a planter.

As can be seen in FIGS. 1A and 1B, the planter has an external attachment formation 28 proximate the plant holder mouth for attaching plant supports. One example of such a plant support is a plant trellis 30, shown in FIG. 9, which has a corresponding attachment formation 32, which can fit into the attachment formation 28, spigot and socket fashion. The creeper trellis 30 is arranged to support a creeper plant (not shown), planted in the plant holder when it grows from the plant holder mouth 16, 18.

The planter 10 also has external attachment formations in the form of apertures 34, for holding wire, line or cables that can provide additional structural strength to the planter assembly 50 (e.g., the planter 10) or to provide a structure onto which creepers can grow.

Each planter 10 also includes planting inserts (as shown in FIGS. 7, 8 10, 20A-20D, 31A, 31B, 33, and 34A-G) shaped and dimensioned to fit onto mouths of the plant holders 16, 18. The planting inserts are selected from: a seedling tray, a planting tray and a seeding clip. The planting inserts may be selected based on its suitability for a specific plant.

Figure 7:
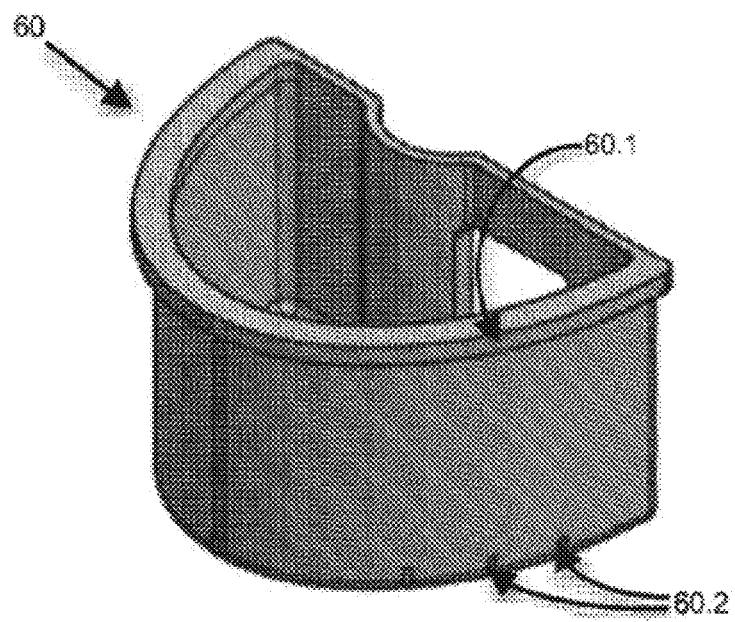
FIG. 7 shows a seedling tray of a planter.

In FIG. 7 a seedling tray 60 is shown, which is shaped and dimensioned to fit into a mouth of a plant holder 16, 18. The seedling tray 60 has a depth of about 43 millimeters (mm). The seedling tray 60 has an inlet opening 60.1 indexed with the inlet openings 16.1, 18.1 of the plant holder. The seedling tray 60 has a planar base cut in sections to provide drainage slits 60.2. The drainage slits 60.2 are less than 0.5 mm in width to permit liquid drainage without flushing seedlings from the seedling tray 60.

Figure 8:
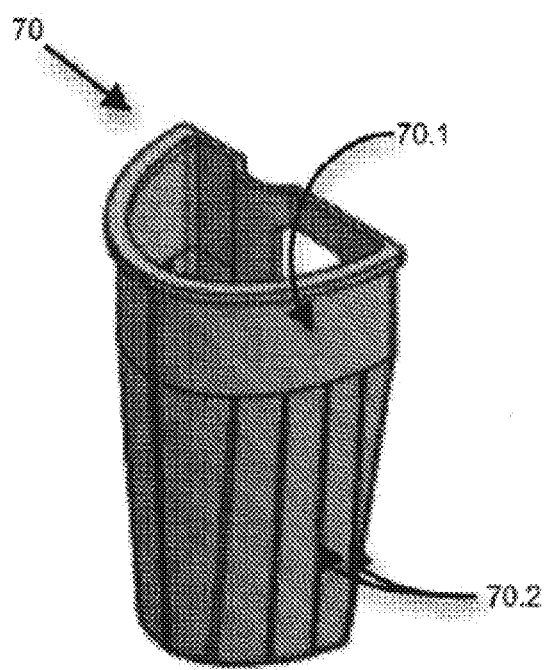
FIG. 8 shows a planting tray of a planter.

In FIG. 8 a planting tray 70 is shown, which is shaped and dimensioned to fit into a mouth of a plant holder 16, 18. The planting tray 70 has a depth of about 117 mm and is in the form of a cylindrical body shaped to the shape of the plant holder 16, 18. The planting tray 70 includes an inlet opening 70.1 indexed with the inlet openings of the plant holder 16.1, 18.1. The planting tray 70 has a planar base cut in sections to provide drainage slits. A portion of the planting tray sidewall also has drainage slits 70.2. The portion of the sidewall is slightly tapered towards the base. The drainage slits is less than 0.5 mm in width to permit liquid drainage without flushing seedlings from the seedling tray 70. Additional features and/or aspects that may be incorporated into tray 70 are described further herein at least with reference to FIGS. 31A and 31B.

Figure 10:
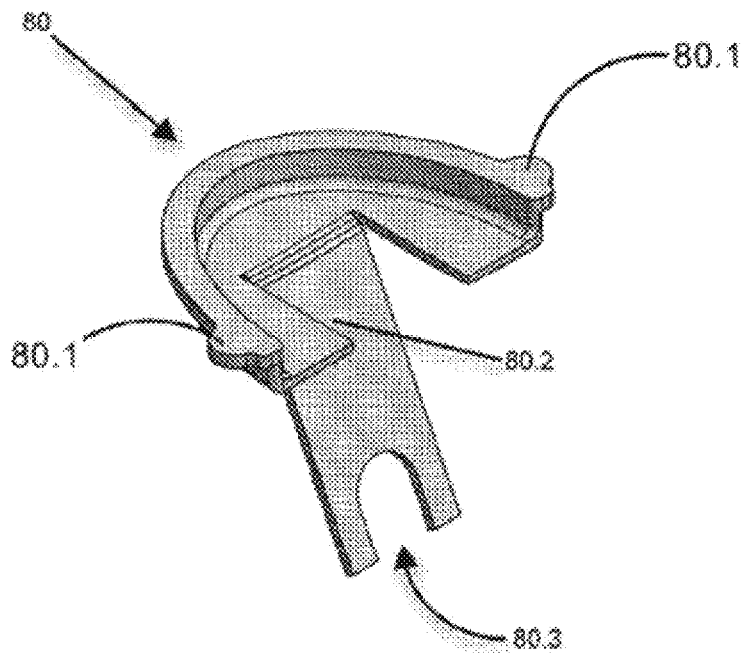
FIG. 10 shows a seeding clip of a planter arrangement.

In FIG. 10 a seeding clip 80 is shown. The seeding clip 80 is shaped to fit onto the mouth of a plant holder 16, 18. The seeding clip 80 has a planar body for closing the planter mouth and is provided with a downwardly projecting plate 80.2 and a slot 80.3 shaped to engage the stem of a plant. The seeding clip 80 further includes finger projections 80.1, which can be compressed towards each other for removing the seeding clip 8 from the mouth of the plant holder 16, 18.

Figures 13C, 13D:
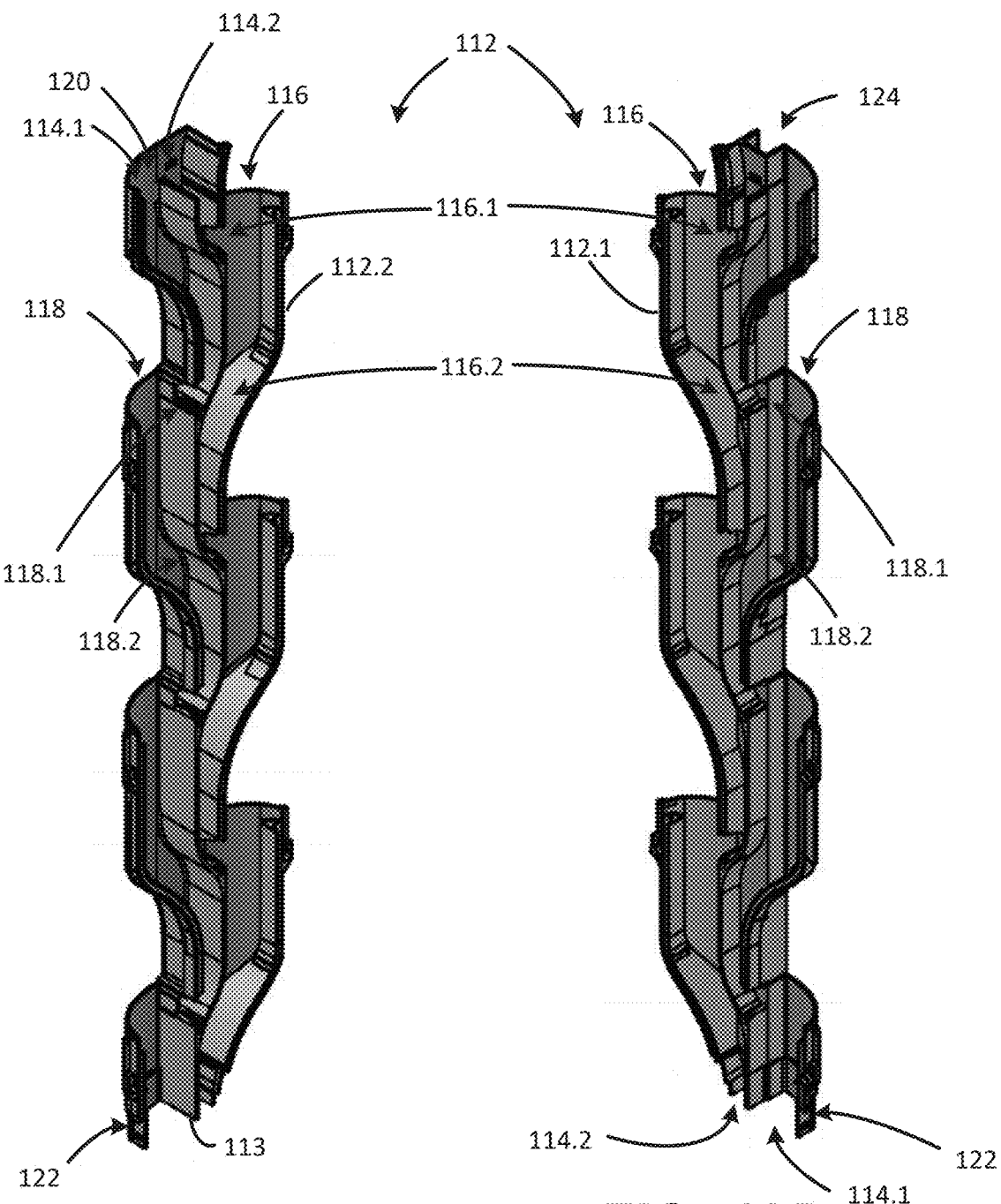
Figure 13E:
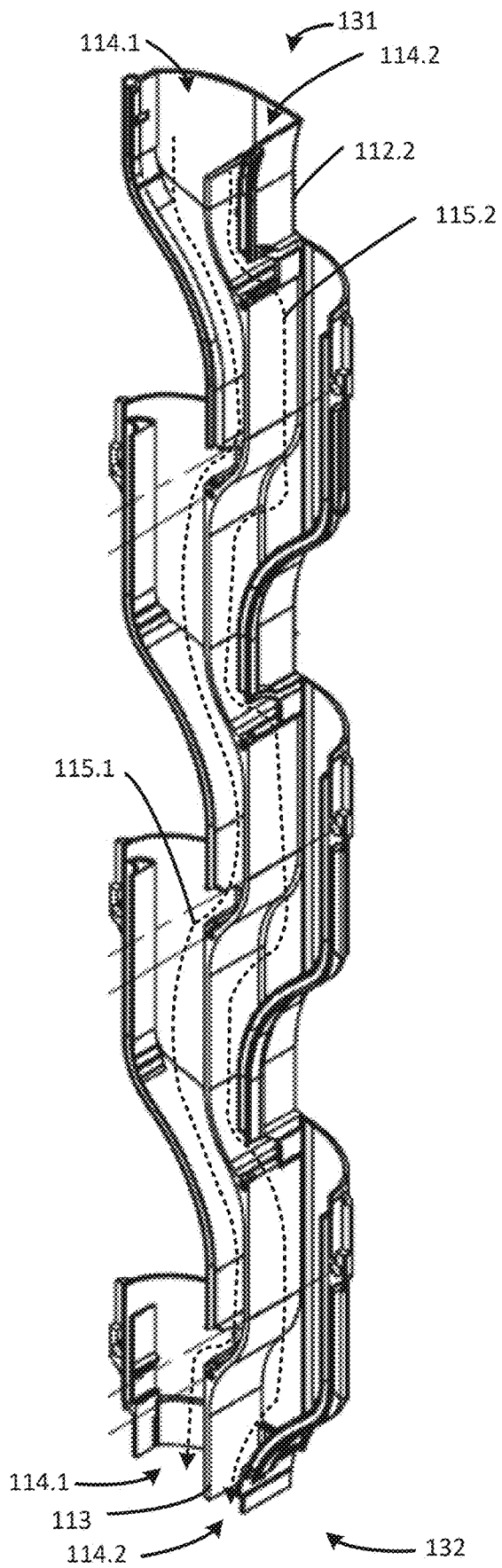

Although planter 10 has been described as having one or more features, it is understood that planter 10 is not limited to such features and that other aspects of the disclosure may be incorporated in planter 10 and/or substitute other features of planter 10. For example, planter 10 may include a longitudinally extending channel 124 (as described with reference to at least FIG. 13A), one or more mounting ports 324 (as described at least with reference to FIG. 26B), or a combination there. Additionally, or alternatively, planter 10 may include one or more overflow channels 333 (e.g., bypass channels), as described at least with reference to FIG. 28A.

Figure 4:
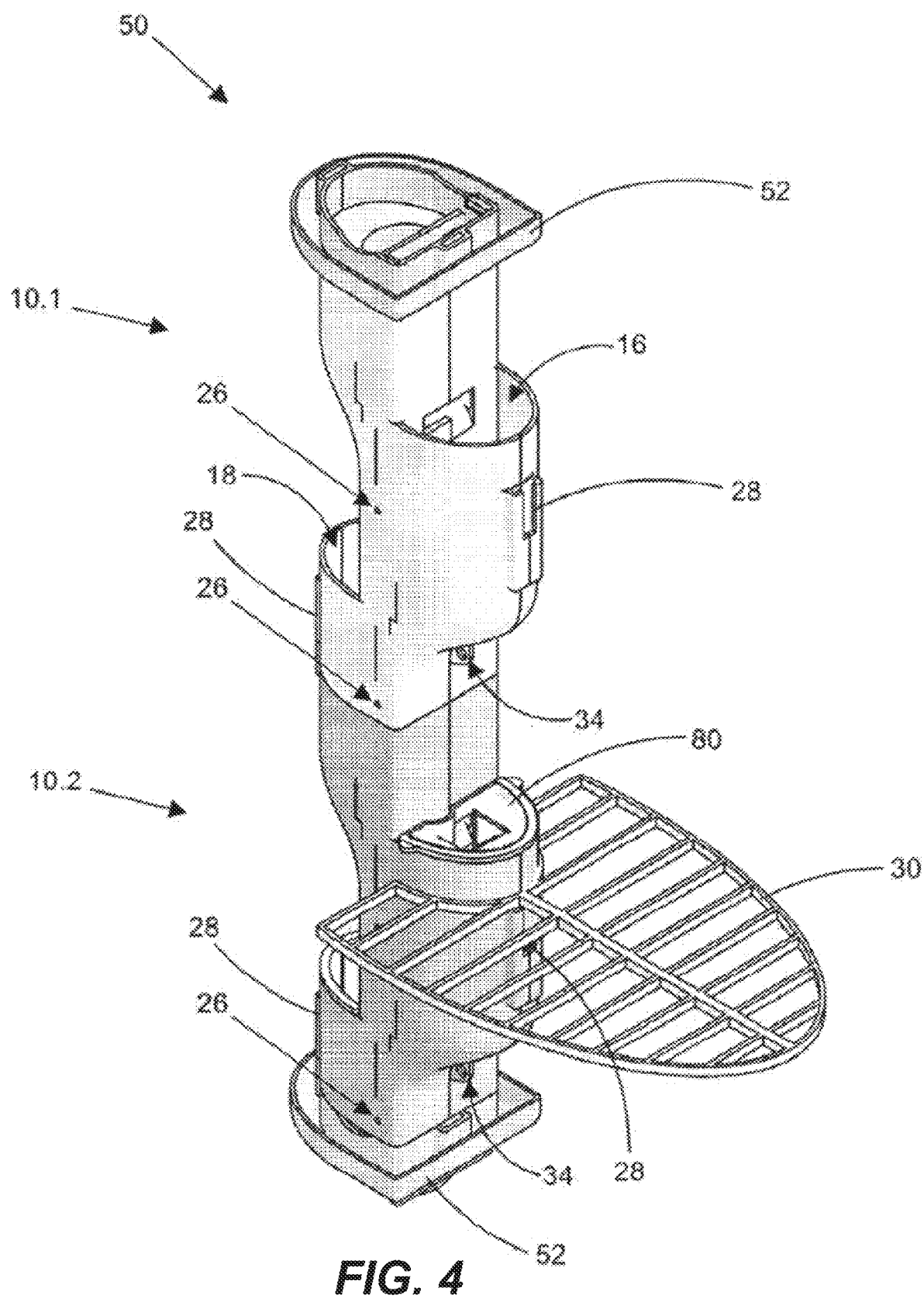
FIG. 4 shows a planter tower comprising assembled planters of FIGS. 1A and 1B.

FIG. 4 shows a planter tower 50 (e.g., a planter assembly) in accordance with a further aspect of the disclosure. In this example, the planter tower 50 includes two planters 10.1, 10.2 as described, connected together to form an elongate upright planter, with plant holders 16, 18 extending from the sides of the planter tower 50 (It is to be appreciated that in some implementations, a planter tower would include about eight planters connected together as shown in FIG. 11). Although shown as including two planters 10.1, 10.2, in other implementations, tower 50 having four plant holders may constitute a single plant holder, such as a single plant holder having a first longitudinal half coupled to a second longitudinal half.

Figure 6A:
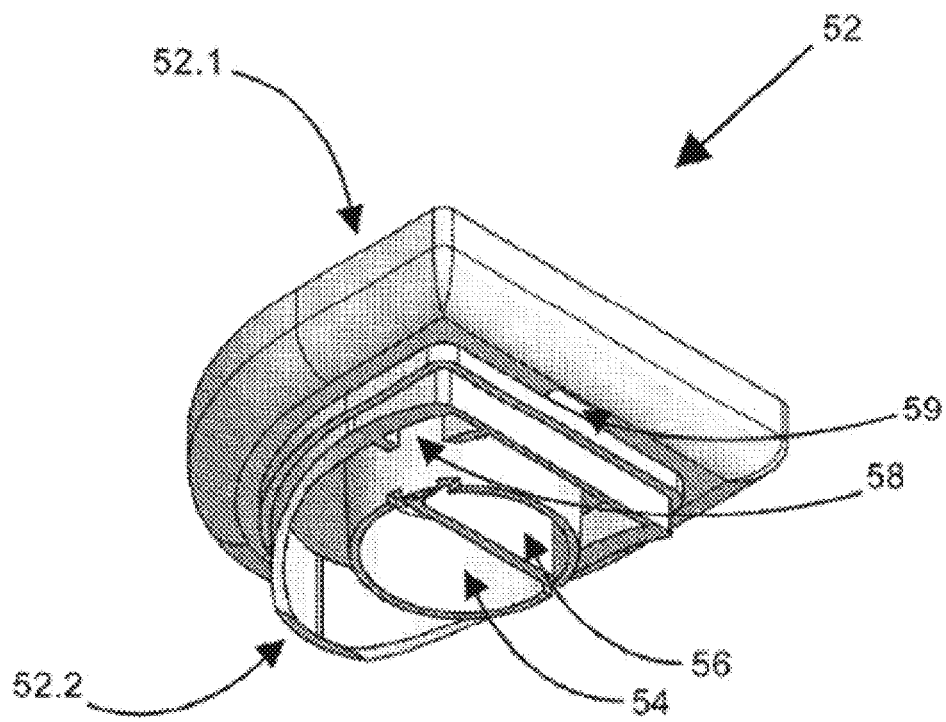
FIGS. 6A and 6B show three-dimensional views of an end member of a planter arrangement.
Figure 6B:
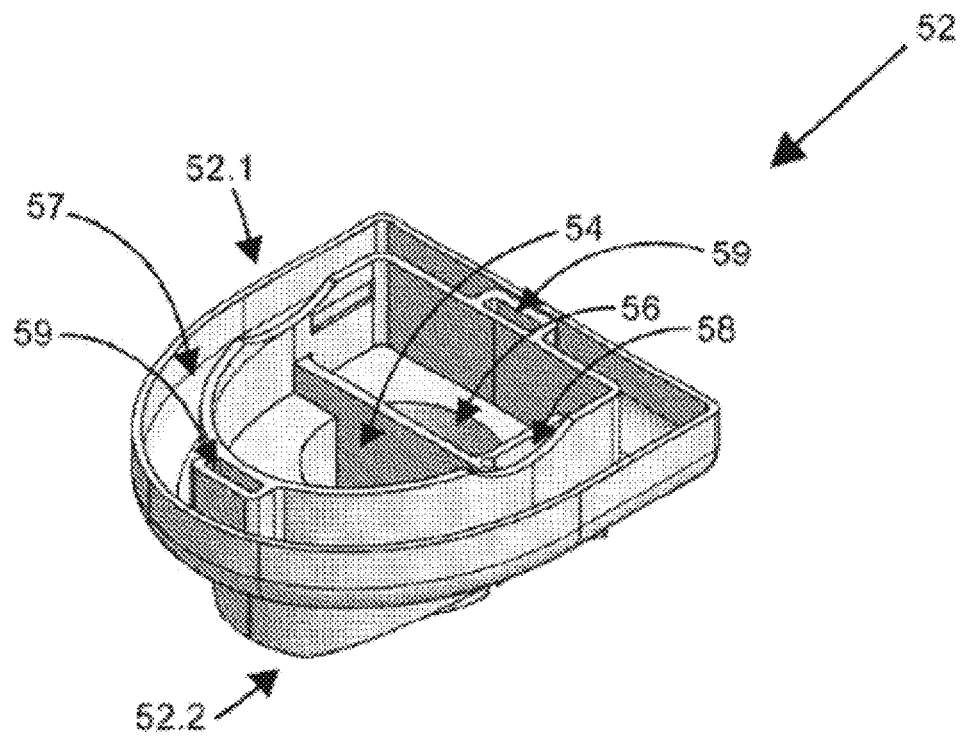

The planter tower 50 is provided with two end members 52, as shown in FIGS. 6A and 6B. (not mounted in FIGS. 6A and 6B) shaped to fit socket and spigot fashion onto a top or bottom end of a longitudinal body 12 of a planter 10. Additional features and/or aspects that may be incorporated into end member 52 are described further herein at least with reference to FIGS. 16A-16C, 16E, 17A, 17B, 29A, 29B, 30A, and 30B.

The end members 52 have dual liquid conduits 54, 56 indexed to match the longitudinally extending liquid channels 14.2, 14.1. The end members 52 also each have a gas conduit 58 indexed to match the gas channel 24 extending through the planters.

The end members 52 each has a body with two sides, an upper side which is provided with a socket formation 52.1 and a bottom side which is provided with a spigot formation 52.2 for fitting onto matched spigot-22 and socket-20 formations on the ends of the longitudinal body 12 of the planters 10. The upper and bottom sides further includes a recessed cradle formation for receiving a top liquid and gas supply line (as shown in FIG. 11) and a bottom liquid and gas collection line across the end members. In this example the upper cradle formation is dimensioned to fit a 50 mm to 65 mm pipe and the bottom cradle formation is dimensioned to fit a 110 mm to 160 mm pipe.

In this example, the planter tower 50 includes a top end member 52 for connecting to the top end of the plurality of planters 10.1, 10.2 and a bottom end member 52 for connecting to the bottom end of the plurality of planters 10.1, 10.2. The top end member 52 and bottom end member 52 are identical in shape and dimension, but function as an intake closure 52 and outlet closure 52, respectively.

The intake closure 52 attached at a top end of a plurality of interconnected planters, being operable to direct liquid into the two longitudinally extending liquid channels 14.1, 14.2 and for directing gas into the longitudinally extending gas channel 24.

The outlet closure 52 attached at a bottom end of a plurality of interconnected planters, being operable to direct liquid out from the two longitudinally extending liquid channels 14.1, 14.2.

The liquid channels 14.1, 14.2 and gas channel 24 extend over the length of the inter-connected planters 10. For example, referring to FIG. 5, a portion of planter assembly 50 is shown. Planter assembly 50 includes a first end 41 and a second end 42 that is opposite first end 41. As shown in FIG. 5, liquid channels 14.1, 14.2 extend over the length of the planter assembly 50 between the first end 41 and the second end 42. The first liquid channel 14.1 is distinct from the second liquid channel 14.2. To illustrate, a longitudinal body of the planter assembly 50 may define a single longitudinal conduit which is internally divided (by a divider 13) to at least in part define the at least two longitudinally extending liquid channels 14.1 and 14.2.

The planter assembly 50 includes at least two plant holders (e.g., 16, 18) defined on the outer circumference of the longitudinal body. For example, the planter assembly may include a first plant holder, a second plant holder, a third plant holder, and a fourth plant holder. As shown, plant holder 18 includes a first portion and a second portion. Each planter holder is associated a liquid channel. To illustrate, the first and third plant holders correspond to liquid channel 14.2 and the second and fourth plant holders correspond to liquid channel 14.1.

As shown in FIG. 5, the first fluid channel 14.1 and second fluid channel 14.2 may corresponds to and/or define fluid paths 43.1, 43.2, respectively between first end 41 and second end 42. Fluid path 43.1 may include at least a first fluid path 45 between first end 41 and opening 18.1 (e.g., inlet of second plant holder), and a second fluid path 46 between opening 18.2 (e.g., outlet of second plant holder) and opening 18.1 (e.g., inlet of fourth plant holder). Fluid path 43.2 may include at least a third fluid path 47 between first end 41 and opening 16.1 (e.g., inlet of first plant holder), a fourth fluid path 48 between opening 16.2 (e.g., outlet of first plant holder) and opening 16.1 (e.g., inlet of third plant holder), and a fifth fluid path 49 between opening 16.2 (e.g., outlet of third plant holder) and second end 42.

The bottom side of the end members 52 also includes a catchment tray 57 on the outer perimeter of the end members. When the end member 52 is used as a bottom end member, the catchment tray 57 is operable to receive overflow liquid from the planter tower 50.

As can be seen in FIG. 4, the plant holders 16, 18 which are alternatively spaced on opposed sides over the length of the of the planter tower 50, provide for maximum space and access to sunlight for the plants. Furthermore, with the roots growing downwardly, possibly into the liquid channels 14.1, 14.2, maximum provision is made for root growth, without interference from plants directly below or above any planter.

FIG. 11 shows a hydroponic greenhouse 100 in accordance with yet a further aspect of the disclosure. The hydroponic greenhouse 100 includes an array of planter towers as described. In this figure only one row of planter towers 50.1 to 50.10 are shown (for illustrative purposes), however in practice the hydroponic greenhouse includes a plurality of parallel spaced planter tower rows. Greenhouse 100 may also include one or more systems 101 (and/or one or more sub-systems), as described further herein. For example, the one or more systems 101 may include or correspond to a liquid circulation system, a gas circulation system, an air conditioner, a high pressure fan, a damper, a coiled cooler for recirculation of liquid or gas (e.g., from the liquid collection lines to the liquid supply lines and/or alternatively gas supply lines), a geothermal heater/cooler, a heat pump, a humidity controller, an infra-red controller, a nutrient supply system, or a combination thereof. The one or more systems 101 may be coupled to or operable with one or more planters (e.g., one or more plant towers and/or one or more rows of plant towers).

The rows being provided with a top liquid and gas supply line 102, connected via an intake closure 52 to a top of each of the planter towers 50 (e.g., 50.1 to 50.10). The rows are further provided with a bottom liquid and gas collection line 103, connected via an outlet closure 52 to a bottom of each of the planter towers 50 (e.g., 50.1 to 50.10).

The hydroponic greenhouse 100 includes a liquid circulation system (not shown), connected to the liquid supply lines 102 and the liquid collection lines 103 and a gas circulation system (not shown), connected to the gas supply lines 102 and the gas collection lines 103.

In this example the top liquid and gas supply line 102 includes a 50 mm to 65 mm diameter plastic outer pipe, onto which the top end members 52 of each planter tower 50 in the row is attached. The 50 mm to 65 mm diameter plastic outer pipe includes interspaced apertures through which liquid and gas is fed into the planter towers 50. The top end members (inlet closures) 52 are secured to the pipe via connectors. In this example the connectors are in the form of cable ties (not shown), which are threaded through connector apertures 59 on the end members 52. An example of a tie is described further herein with reference to at least FIG. 16D.

In this example the bottom liquid and gas collection line 103 includes a 110 mm to 160 mm diameter plastic outer pipe, onto which the bottom end members (outlet closures) 52 of each planter tower 50 (e.g., 50.1 to 50.10) in the row is attached. The 110 mm to 160 mm diameter plastic outer pipe includes interspaced apertures through which liquid and gas is received from the planter towers 50 (e.g., 50.1 to 50.10). The bottom end members 52 are secured to the pipe via connectors. In this example the connectors are in the form of cable ties (not shown), which are threaded through connector apertures 59 on the end members 52. An example of a tie is described further herein with reference to at least FIG. 16D.

The hydroponic greenhouse includes a partially closed enclosure (not shown), which is provided with any one or more of: air conditioners, high pressure fans, dampers, coiled coolers for recirculation of the liquid or gas from the liquid collection lines to the liquid supply lines or alternatively gas supply lines, geothermal heater/coolers, heat pumps, humidity controllers and infra-red controllers.

The hydroponic greenhouse is also provided with a nutrient supply dosing pump (not shown) connected to the liquid circulation system for dosing nutrients into the liquid circulation system.

The hydroponic greenhouse is further provided with a filtering arrangement (not shown) connected to the liquid circulation system for filtering the liquid in the liquid circulation system.

Figure 12:
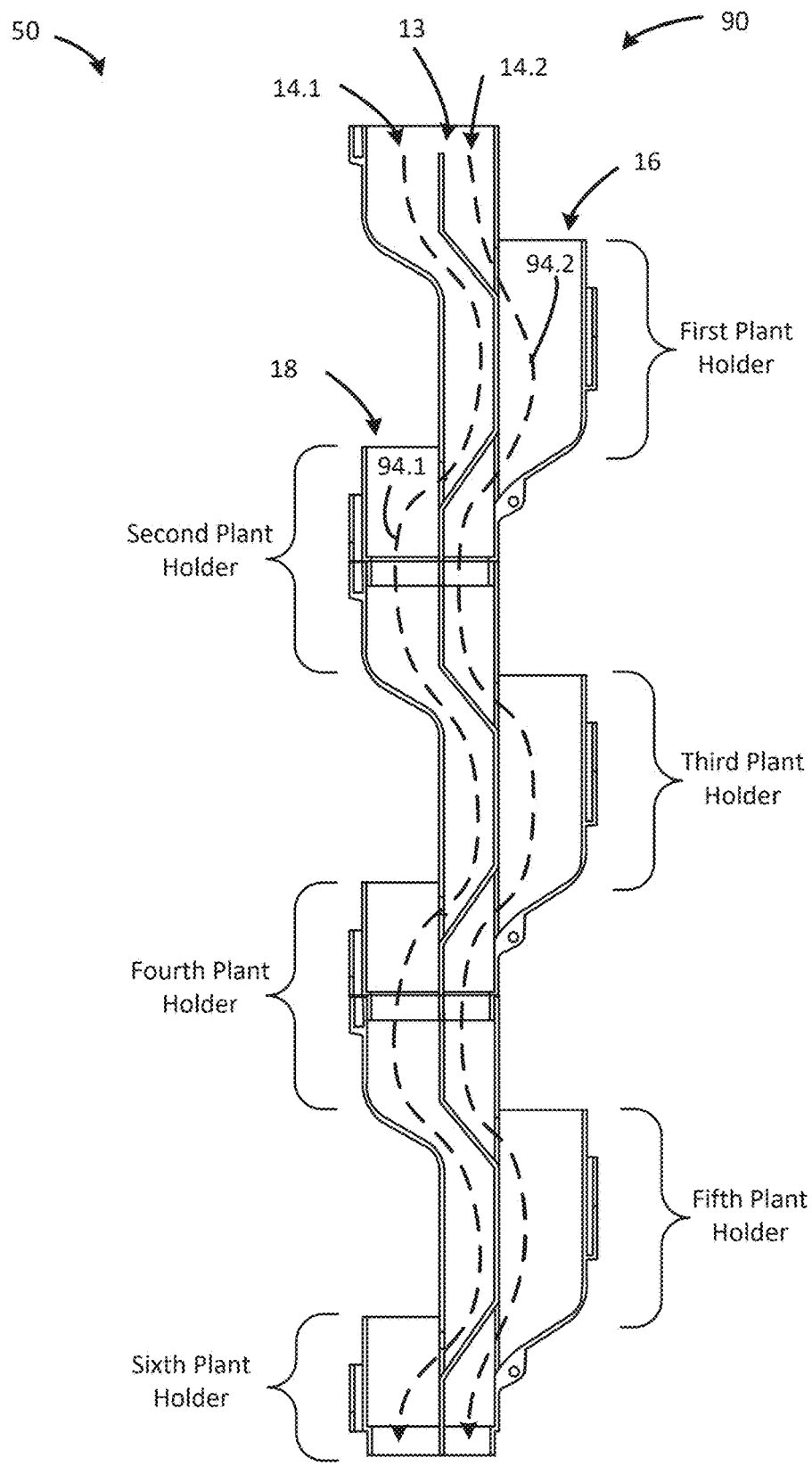
FIG. 12 shows a side view of a portion of a planter apparatus.

Referring to FIG. 12, a portion of planter assembly 50 is shown. As shown in FIG. 12, the portion of the planter assembly 50 may include a portion of a plant tower, such as a portion of the plant tower 50.1. The planter assembly of FIG. 12 includes a first end 90 and a second end 92 that is opposite first end 90. As shown in FIG. 12, liquid channels 14.1, 14.2 extend over the length of the planter assembly 50 between the first end 90 and the second end 92. The first liquid channel 14.1 is distinct from the second liquid channel 14.2. To illustrate, a longitudinal body of the planter assembly 50 of FIG. 12 may define a single longitudinal conduit which is internally divided (by a divider 13) to at least in part define the at least two longitudinally extending liquid channels 14.1 and 14.2.

The planter assembly 50 of FIG. 12 includes at least two plant holders (e.g., 16, 18) defined on the outer circumference of the longitudinal body. For example, the planter assembly may include a first plant holder, a second plant holder, a third plant holder, a fourth plant holder, a fifth plant holder, and a sixth plant holder. Each plant holder is associated a liquid channel. To illustrate, the first, third, and fifth plant holders correspond to liquid channel 14.2 and the second, fourth, and sixth plant holders correspond to liquid channel 14.1.

The liquid channels 14.1, 14.2 extend over the length of the planter assembly 50 of FIG. 12. As shown in FIG. 12, the first fluid channel 14.1 and second fluid channel 14.2 may corresponds to and/or define fluid paths 94.1, 94.2, respectively between first end 90 and second end 92.

In a particular implementation, a planter 50 (e.g., planter 10) includes a longitudinal body defining at least two longitudinally extending liquid channels 14.1, 14.2. The planter 50 also includes at least two plant holders (e.g., 16, 18) defined in the body. The plant holders (e.g., 16, 18) are spaced on the outer circumference of the longitudinal body. Each one of the at least two plant holders (e.g., 16, 18) is in fluid flow communication with one of the at least two longitudinally extending liquid channels 14.1, 14.2. In some implementations, the longitudinal body may include a single longitudinal conduit which is internally divided (e.g., by at least the divider 13) to define the at least two longitudinally extending liquid channels 14.1, 14.2.

Referring to FIGS. 13A-13E, an example of a planter 110 is shown. Planter 110 may include or correspond to a planter, a planter assembly, or a planter tower. For example, planter 110 may include or correspond to planter 10 and/or planter assembly 50 (e.g., planter tower 50.1-50.10). To illustrate, planter 110 may incorporate one or more features as described with reference to planter 10 and/or planter assembly 50.

Figure 14C:
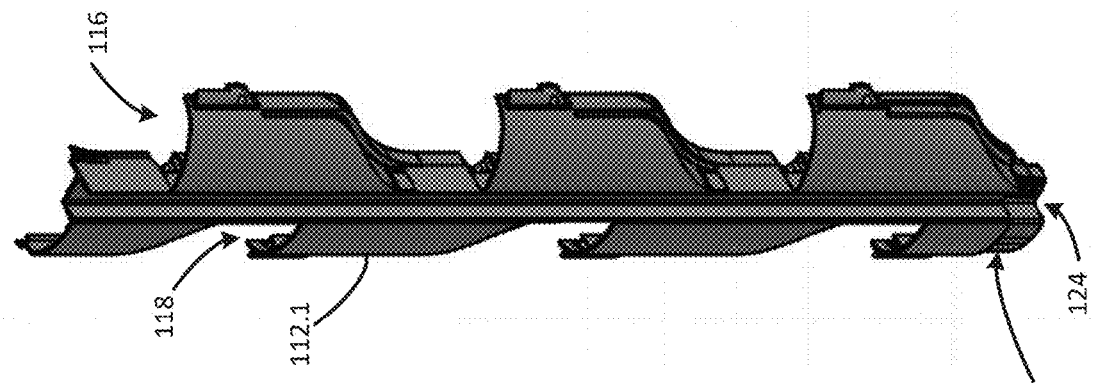
FIGS. 14A to 14C show three-dimensional views of an example of a portion of a planter.
Figure 14B:
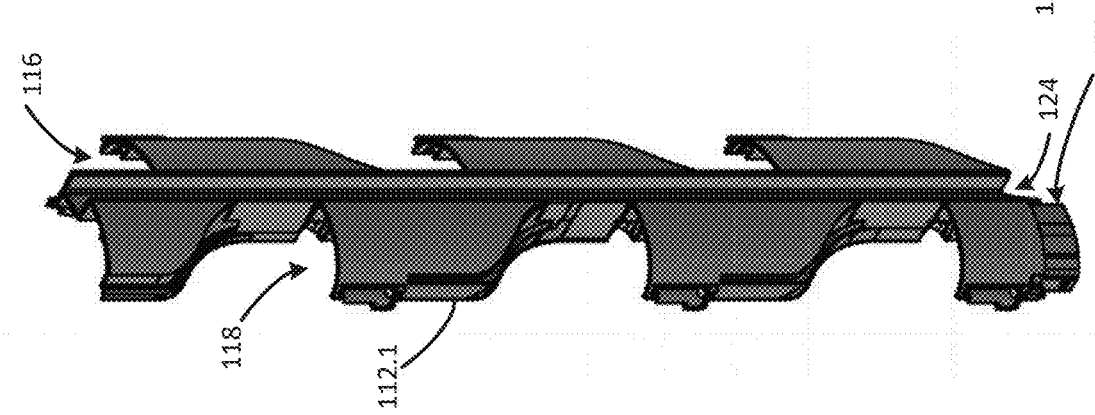
Figure 14A:
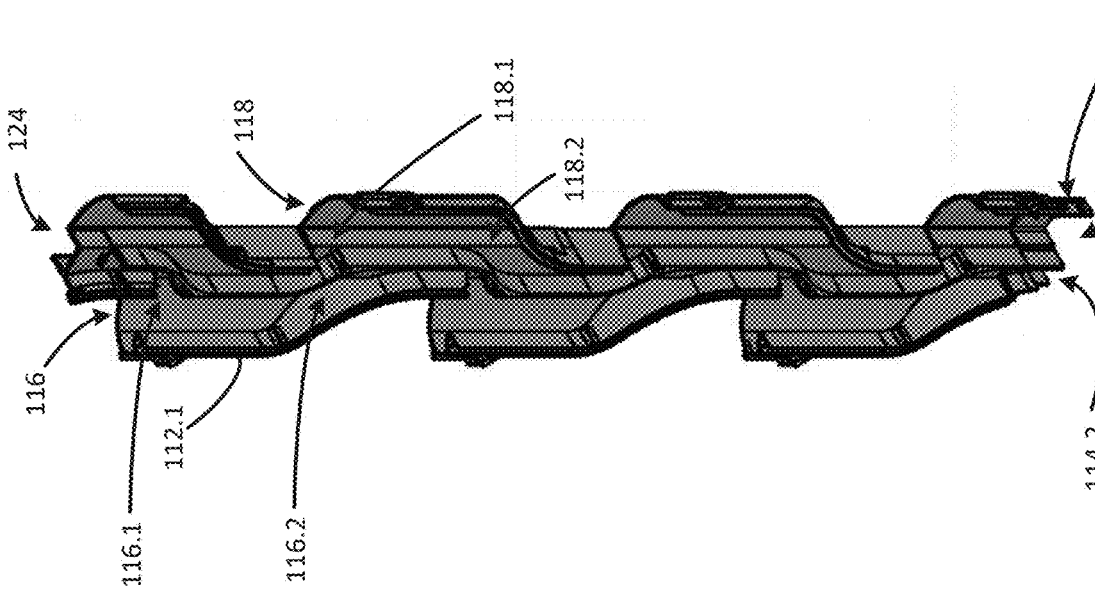

The planter 110 has a longitudinal body 112. The planter 110 includes a first end 131 and a second end 132 that is opposite the first end 131. As an illustrative, non-limiting example, the longitudinal body 112 may include multiple portions (e.g., two halves) 112.1 and 112.2 that are coupled together. Views of a first portion 112.1 (e.g., a first half) are shown with reference to FIGS. 14A-14C. Views of a second portion 112.2 (e.g., a second half) are shown with reference to FIGS. 15A-15C.

The longitudinal body 112 defines two longitudinally extending liquid channels 114.1 and 114.2. For example, a first liquid channel 114.1 extends between the first end 131 and the second end 132 and a second liquid channel 114.2 extends between the first end 131 and the second end 132. For example, the first fluid channel 114.1 and second fluid channel 114.2 may corresponds to and/or define fluid paths 115.1, 115.2, respectively, between the first end 131 and the second end 132. The first liquid channel 114.1 is distinct from the second liquid channel 114.2. To illustrate, the longitudinal body 112 may include a single longitudinal conduit which is internally divided (by a divider 113) into the at least two longitudinally extending liquid channels 114.1 and 114.2.

The planter 110 includes at least two plant holders 116, 118 defined on the outer circumference of the longitudinal body. The at least two plant holders 116, 118 are alternatively spaced on opposed sides of the longitudinal body. The at least two plant holders 116, 118 may have holder mouths in the form of applanated cylindrical ellipses. Each of the two plant holders 16, 18 has corresponding openings 16.1, 18.1 defining liquid inlets to the plant holder and corresponding openings 16.2, 18.2 defining liquid outlets from the plant holders. To further illustrate, each plant holder 116, 118 has an inlet opening 116.1, 118.1 and an outlet opening 116.2, 118.2, respectively, which forms part of its corresponding liquid channel 114.2 and 114.1, respectively. As can be seen, the inlet openings 116.1, 118.1 are located above the outlet openings 116.2, 118.2 to permit liquid to flow into the plant holders 116, 118 through the inlet openings 116.1, 118.1 and from the plant holder through the outlet opening 116.2, 118.2. As identified in FIG. 13B, a ridge 117 am be positioned at the inlet openings 116.1. The ridge 117 may disrupt a flow of liquid such that the flow of liquid is slowed and/or is directed into a plant holder (e.g., 116, 118). In some implementations, ridge 117 may extend an entire width of the inlet opening 116.1, 118.1. In other implementations, ridge 117 may not extend an entire width of the inlet opening 116.1, 118.1 and/or may include multiple ridges. Additionally, or alternatively, ridge 117 may have one or more planar surfaces, one or more curved or curvilinear surfaces, and/or have one or more channels or grooves.

Longitudinal body 112 may also include one or more overflow channels 119. The overflow channel 119 may be configured to bypass a portion of a corresponding liquid channel 114.2 and 114.1. An overflow channel may have an overflow inlet positioned in a plant holder 116, 118, such as near a rim or mouth of the plant holder 116, 118. In other implementations, the overflow inlet may be offset from the rim or mouth of the plant holder 116, 118, such that the overflow inlet is closer to a middle of the plant holder 116, 118 or is positioned between a middle of the plant holder 116, 118 and a rim of the plant holder 116, 118. The overflow channel 119 may have an overflow outlet that is open to a corresponding liquid channel 114.1, 114.2.

As shown in FIGS. 13A-13E, the planter includes a first plant holder, a second plant holder, a third plant holder, a fourth plant holder, a fifth plant holder, and a sixth plant holder. It is noted that the opening (e.g., the liquid outlet) of the sixth plant holder may include or correspond to an opening associated with the second end 132.

The longitudinal body 112 has connecting formations 120, 122 in the form of socket and spigot formations at the ends of the longitudinal body 112. The connecting formations 120, 122 are shaped and dimensioned to fit into respective spigot and socket formations of corresponding planters and/or corresponding end members. For example, the operative lower end of the longitudinal body 112 of the planter 110 has a spigot formation 122, for fitting into a socket formation 120 on an operative upper end of a longitudinal body 112 of a corresponding planter 110 installed below the former planter. An example of spigot formation 122 positioned to be coupled to a corresponding socket formation 120 is described at least with reference to FIG. 21.

The planter 110 further includes a longitudinally extending channel 124 associated with a gas channel. The gas channel, as described further herein with reference to at least FIGS. 18A, 18B, 25A, and 25B, has outlets spaced along its length. In particular, the gas channel has outlets that open to the outside of the planter body 112 (see at least FIGS. 25A and 25B). The gas outlets may be in the form of openings or nozzles that are directed at plants in adjacent planter towers to promote gas exchange on the leaves of those plants. In some implementations, a cover may be coupled to/over channel 124 to form the gas channel. In other implementations, a conduit (e.g., a tube) may be coupled to channel 124, where the conduit includes the gas channel. Additionally, or alternatively, the channel 124 may include one or more coupling structures (e.g., grooves) configured to couple the cover and/or the conduit to or within the channel 124.

Planter 110 has an external attachment formation 128 proximate the plant holder mouth for attaching plant supports. One example of such a plant support is the plant trellis 30, shown in FIG. 9, which has a corresponding attachment formation 32, which can fit into the attachment formation 128, spigot and socket fashion. The creeper trellis 30 is arranged to support a creeper plant (not shown), planted in the plant holder when it grows from the plant holder mouth 116, 118.

The planter 110 also has external attachment formations in the form of apertures 134, for holding wire, line or cables that can provide additional structural strength to the planter 110 (or an assembly of multiple planters 110) or to provide a structure onto which creepers can grow.

A mouth of a plant holder (e.g., 116, 118) may be configured to receive and/or support a planting inserts, such as a seedling tray, a planting tray, a seeding clip, or other insert. The planting inserts may be selected based on its suitability for a specific plant. Illustrative, non-limiting examples of planting inserts for use with planter 110 include the seedling tray 60, the planting tray 70, the seeding clip 80, a tray 200 of FIGS. 20A-20D, or a tray 430 of FIGS. 34A-34G. Additional illustrative examples may include examples as described further herein at least with reference to FIGS. 31A, 31B, 32.

In a particular implementation, a planter 110 includes a longitudinal body 112 defining at least two longitudinally extending liquid channels 114.1, 114.2. The planter 110 also includes at least two plant holders (e.g., 116, 118) defined in the body 112. The plant holders (e.g., 116, 118) are spaced on the outer circumference of the longitudinal body 112. Each one of the at least two plant holders (e.g., 116, 118) is in fluid flow communication with one of the at least two longitudinally extending liquid channels 114.1, 114.2. In some implementations, the longitudinal body 112 may include a single longitudinal conduit which is internally divided (e.g., by at least the divider 113) to define the at least two longitudinally extending liquid channels 114.1, 114.2.

In some implementations, the at least two plant holders (e.g., 116, 118) may be located on opposed sides of the longitudinal body 112. For example, the at least two plant holders (e.g., 116, 118) may be alternatively spaced on opposed sides over the length of the longitudinal body 112. In some such implementations, each of the plant holders (e.g., 116, 118) may be in fluid flow communication with a different one of the longitudinally extending liquid channels 114.1, 114.2. Additionally, or alternatively, the planter 110 may include at least one longitudinally extending channel 124 associated with a gas channel having gas outlets spaced along its length. The gas outlets may open to the outside of the planter body. The gas outlets may be in the form of nozzles.

Figure 16A:
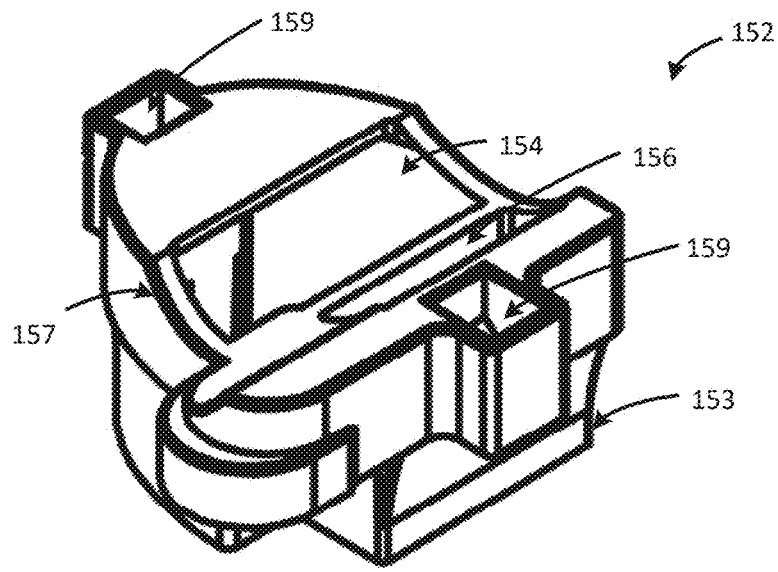
FIGS. 16A to 16C show views of an end member of a planter arrangement.
Figure 16B:
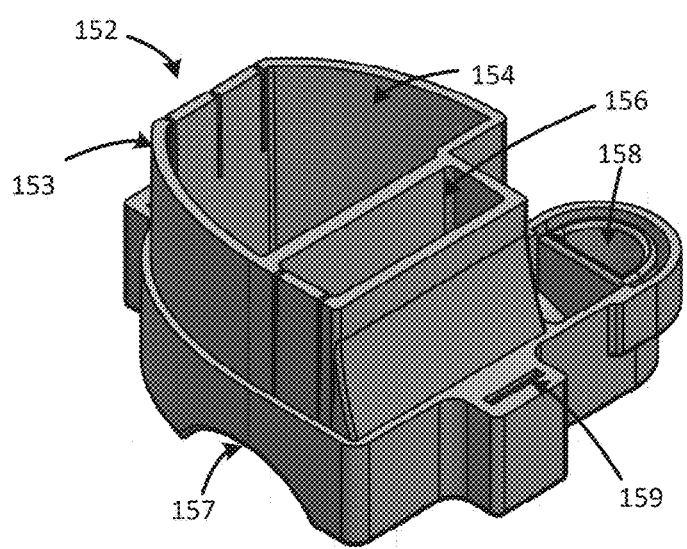
Figure 16C:
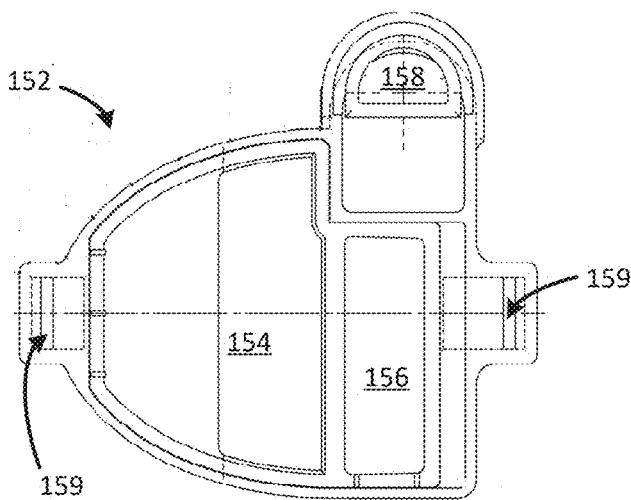

Referring to FIGS. 16A-16C, an example of an end member 152 (e.g., a top end member) is shown. FIG. 16A includes a top perspective view of the end member 152, FIG. 16B includes a bottom perspective view of the end member 152, and FIG. 16C includes a bottom view of the end member 152. The end member 152 may be referred to as a canopy of a planter (e.g., 10, 110) or a planter assembly (e.g., 50). The end member 152 is configured to fit socket and spigot fashion onto a top of a longitudinal body (e.g., 12, 112) of a planter.

The end member 152 has dual liquid conduits 154, 156 indexed to match longitudinally extending liquid channels, such as liquid channels 14.1, 14.2 or liquid channels 114.1, 114.2. The end members 152 also each have a gas conduit 158 indexed to match a gas channel. In some implementations, the gas conduit 158 may be configured as a cavity that operates as an end cap for a gas channel.

The end member 152 includes connector apertures 159 through which a connector, such as a tie, may be inserted. An example of a connector is described at least with reference to FIG. 16D and an example of a connector coupled to the end member 152 is descried at least with reference to FIG. 16E.

The end member 152 has a body with two sides, an upper side which is provided with a recessed cradle formation 157 for receiving a liquid supply line 170 (e.g., a pipe) and a bottom side which is provided with a spigot formation 153 for fitting onto matched socket formations of a first end of a longitudinal body (e.g., 12, 112) of a planter. Liquid supply line 170 may include or correspond to liquid supply line 102. An example of the end member 152 coupled to a liquid supply line 170 is shown with reference to FIG. 16E. An example of the end member 152 positioned to be coupled to a planter (e.g., 110) is described at least with reference to FIG. 22.

Figure 16D:
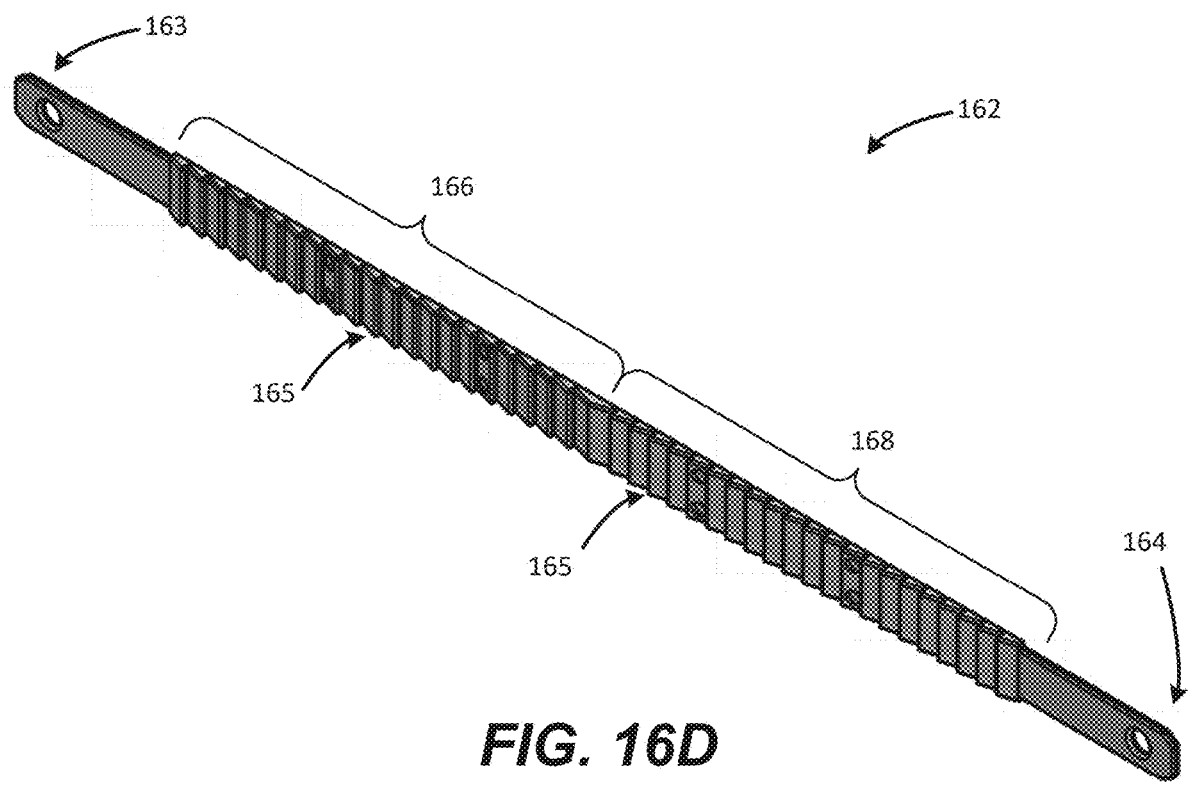
FIG. 16D shows a three-dimensional view of a connector.

Referring to FIG. 16D, an example of the connector 162 is shown. The connector 162 includes a first end 163 and a second end 164 that is opposite the first end 163. The connector 162 includes a plurality of ridges, such as representative ridges 165, on a first side of the connector 162. As an illustrative, non-limiting example, each ridge 165 is wedge shaped (e.g., an inclined plane), as shown. In some implementations, a second side of the connector 162 that is opposite the first side may not have ridges or may have ridges (as described with reference to the first side).

The plurality of ridges may include a first set of ridges 166 and a second set of ridges 168. The ridges 165 of the first set of ridges 166 may a first orientation and the ridges of the second set of ridges 168 may have a second orientation. In a particular implementation, the first orientation is opposite the second orientation. To illustrate, each ridge of the first set of ridges 166 may be positioned such that an inclined surface of the ridge slopes away from the first end 163 to a peak of the ridge, and each ridge of the second set of ridges 168 may be positioned such that an inclined surface of the ridge slopes away from the second end 164 to a peak of the ridge.

Figure 16E:
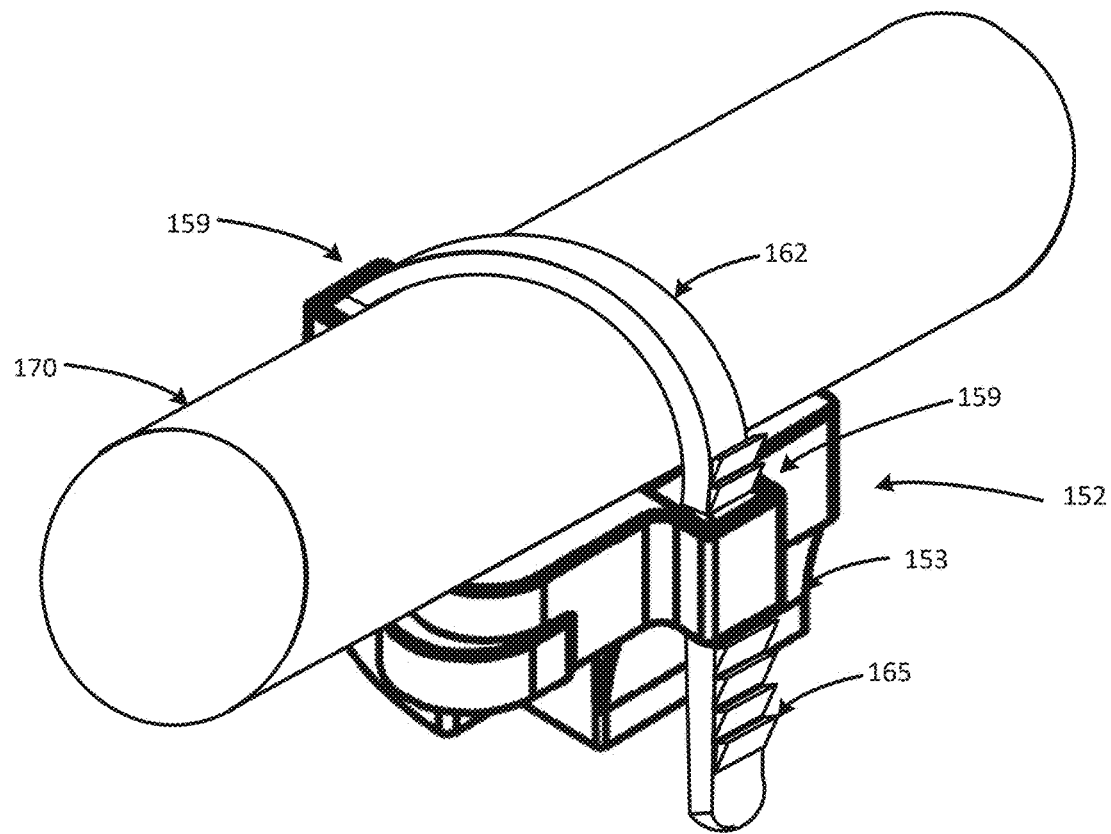
FIG. 16E shows a view of the tie of FIG. 16D coupled to the end member of FIG. 16A.

Referring to FIG. 16E, an example of the end member 152 coupled to the liquid supply line 170 via the connector 162 is shown. As shown, the liquid supply line 170 is positioned in the recessed cradle formation 157 of the end member 152. Additionally, one end of the connector 162 is inserted through one of the connector apertures 159 and the other end of the connector 162 is inserted through the other of the connector apertures 159. As shown, a ridge 165 of the connector 162 secures the connector 162 with respect to the end member 152.

Figure 17A:
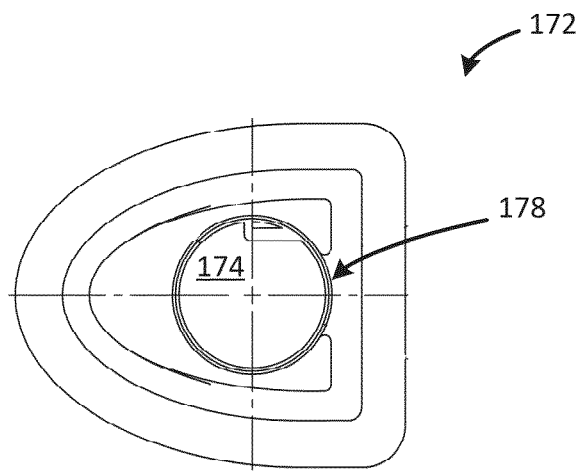
FIG. 17A shows a top view of an end member of a planter arrangement.
Figure 17B:
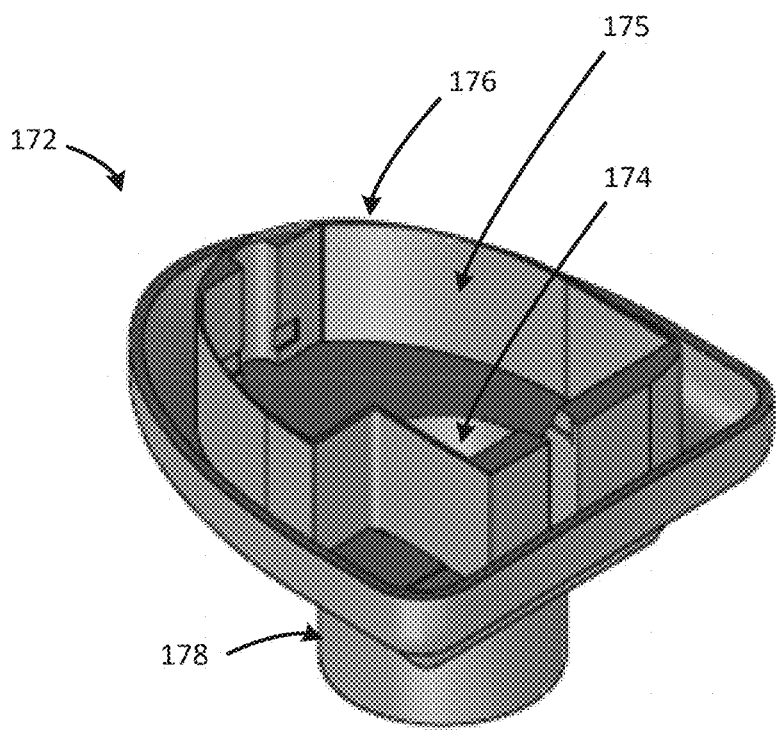
FIG. 17B shows a three-dimensional view of the end member of FIG. 17A.

Referring to FIGS. 17A-17B, an example of an end member 172 (e.g., a bottom end member) is shown. FIG. 17A includes a bottom view of the end member 172 and FIG. 17B includes a top perspective view of the end member 172. The end member 172 may be referred to as a base of a planter (e.g., 10, 110) or a planter assembly (e.g., 50). The end member 172 is configured to fit socket and spigot fashion onto a top of a longitudinal body (e.g., 12, 112) of a planter.

The end member 172 has a liquid conduit 175 configured to receive longitudinally extending liquid channels, such as liquid channels 14.1, 14.2 or liquid channels 114.1, 114.2. The end member 152 has a body with two sides, an upper side which is provided with a socket formation 176 for fitting onto matched spigot formations of a second end of a longitudinal body (e.g., 12, 112) of a planter and a bottom side which is provided with a connector 178 (e.g., coupler) for coupling to a liquid outlet line (e.g., a pipe). An example of the end member 172 positioned to be coupled to a planter (e.g., 110) is described at least with reference to FIG. 23. The end member 172 includes a channel 174 that enables liquid received via the liquid conduit 175 to be provided through the connector 178 to the liquid outlet line (not shown), such as liquid collection line 103.

Figure 18A:
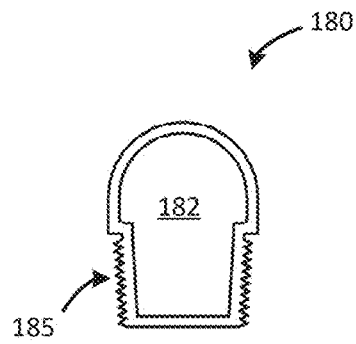
FIG. 18A shows a front view of a conduit of a planter arrangement.
Figure 18B:
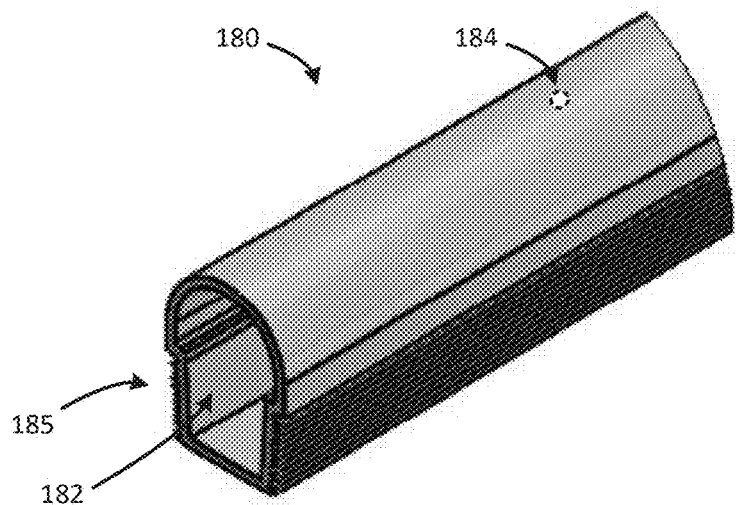
FIG. 18B shows a three-dimensional view of a portion of the conduit of FIG. 18A.

Referring to FIGS. 18A and 18B, examples of a conduit 180 (e.g., a gas channel) are shown. The conduit 180 includes a channel 182 through which gas may be provided. As shown, a portion of an outer surface of the conduit 180 includes one or more grooves 185. The grooves 185 may be configured to enable the conduit 180 to be coupled (e.g., securely coupled) to a planter, a plant tower, a coupler, an end cap, etc. An example of the conduit 180 being coupled to a planter is described at least with reference to FIGS. 24 and 25. The conduit 180 includes outlets, such as a representative outlet 184, spaced along its length. For example, the outlets 184 may open to an outside of a planter body (e.g., 12, 112) and may be configured to provide gas to adjacent plants, planters, or plant towers. In some implementations, the outlets 184 include nozzles.

Figure 19A:
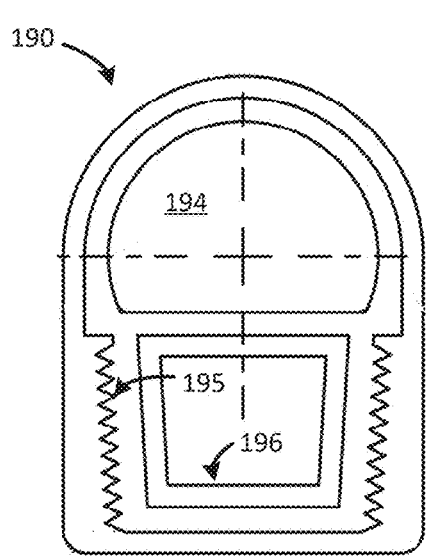
FIG. 19A shows a front view of a coupler for the conduit of FIG. 18A.
Figure 19B:
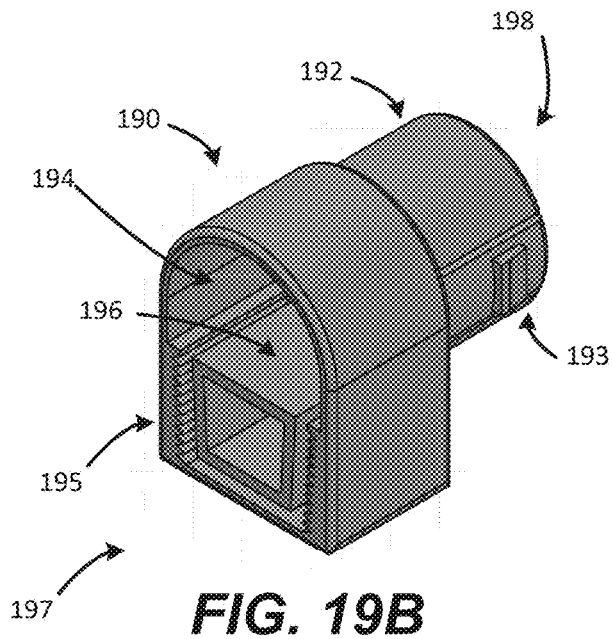
FIG. 19B shows a three-dimensional view of the coupler of FIG. 19A.

Referring to FIGS. 19A and 19B, a coupler 190 (e.g., a grommet) for coupling conduit 180 to a gas supply line is shown. Coupler 190 includes a first end 197 and a second end 198. The first end 197 is configured to be coupled to the conduit 180 and the second end 198 is configured to be coupled to a gas supply line.

The coupler 190 includes a connector 192 to couple the coupler 190 to the gas supply line (not shown), such as a plastic tube. As shown, connector 192 includes a tab 193 over which the gas supply line is inserted. The coupler 190 includes a channel 194 that extends through the coupler 190 between the first end 197 and the second end 198 such that gas provided from the gas supply line may be provided to the conduit 180. As shown, the coupler 190 includes a support structure 196 and one or more grooves 195. The support structure 196 is configured to provide stability and to ensure the conduit 180 maintains its shape as the conduit 180 is inserted into the coupler 190. The grooves 195 are configured to mate with the grooves 185 of the conduit.

Figure 20A:
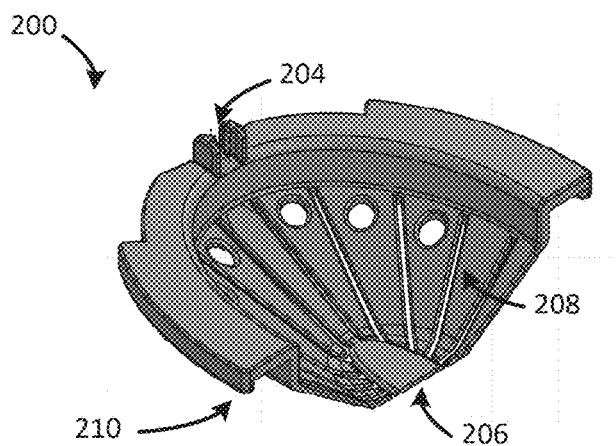
FIGS. 20A to 20D show views of an example of a planting tray.
Figure 20B:
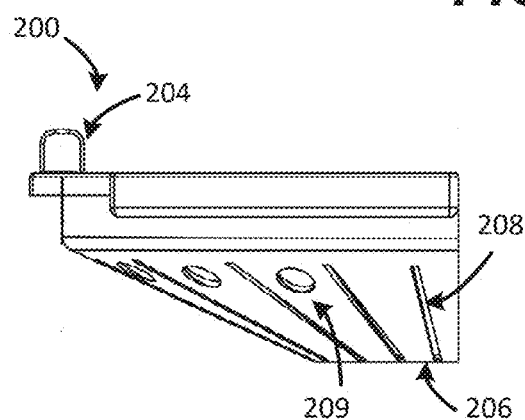
Figure 20C:
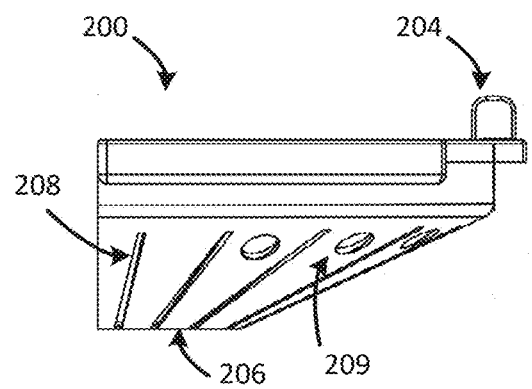
Figure 20D:
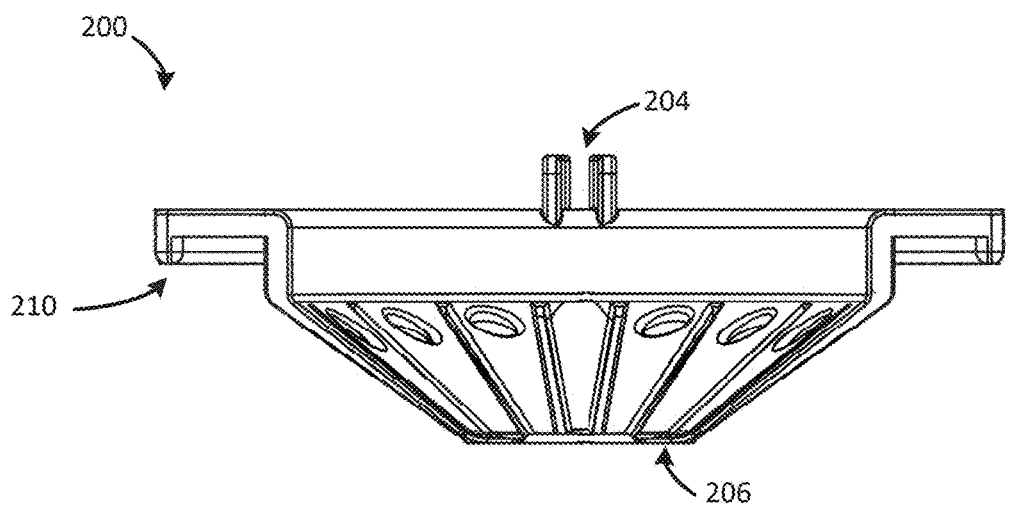

Referring to FIGS. 20A-20D, an example of a tray 200 is shown. For example, FIG. 20A shows a perspective view of the tray 200, FIG. 20B shows a first side view of the tray 200. FIG. 20C shows a second side view of the tray 200, and FIG. 20D shows a rear view of the tray 200.

Tray 200 may be configured to be used as a seedling tray, a planting tray, a seeding clip, or a combination thereof. Tray 200 is shaped and dimensioned to fit into a mouth of a plant holder (e.g., 16, 18, 116, 118). The tray 200 includes one or more rims 210 that are configured to be coupled with an edge of the mouth of the plant holder. The tray 200 has a planar bottom 206 and includes one or more drainage slits 208. The drainage slits 208 are configured to permit liquid drainage without flushing seedlings from the tray 200. As shown, tray 200 also includes drainage holes 209. It is noted, that as a plant grows while supported by/within tray 200, roots of the plant may extend through the drainage slits 208, the drainage holes 209, or both.

Tray 200 also includes a slot 204. The slot 204 may be configured to engage a stem or stalk of a plant. For example, the slot 204 may engage a stem to secure a position of a plant.

Figure 21:
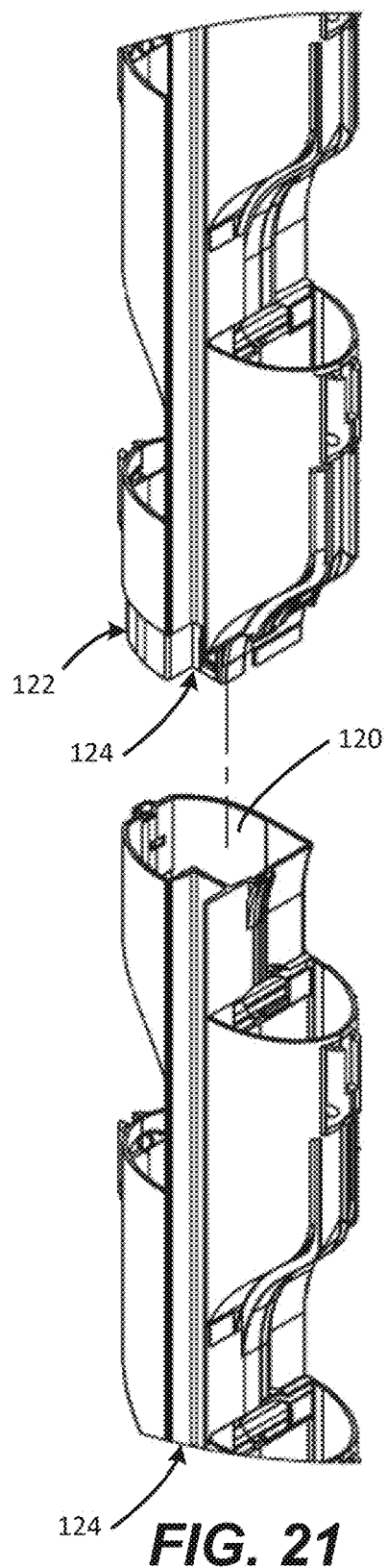
FIG. 21 illustrates an example of coupling assembled planters of FIG. 13A.

Referring to FIG. 21, an example of planters being coupled together is shown. A spigot formation 122 of a first planter may be inserted into a socket formation 120 of a second planter to form a single, combined planter.

Figure 22:
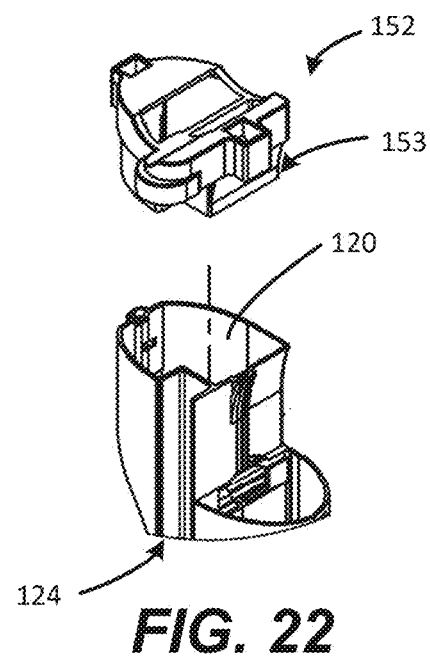
FIG. 22 illustrates an example of coupling the end member of FIG. 16A to an assembled planter of FIG. 13A.

Referring to FIG. 22, an example of the end member 152 being coupled to a planter is shown. The spigot formation 153 of the end member 152 may be inserted into the socket formation 120 of a planter.

Figure 23:
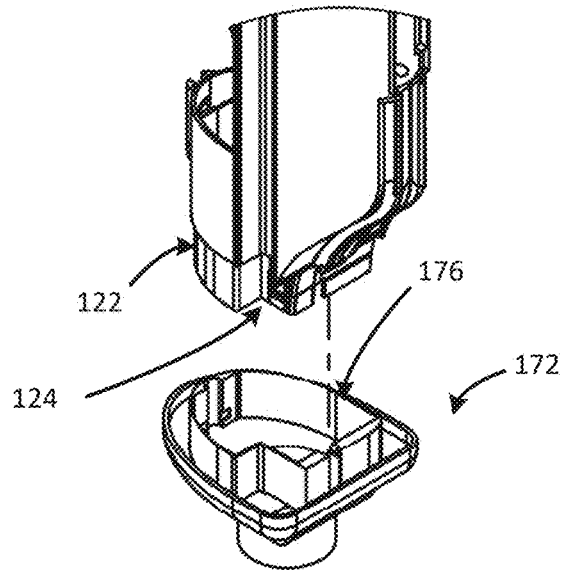
FIG. 23 illustrates an example of coupling the end member of FIG. 17A to an assembled planter of FIG. 13A.

Referring to FIG. 23, an example of the end member 172 being coupled to a planter is shown. The spigot formation 122 of the planter may be inserted into the socket formation 176 of the end member 172.

Figures 24, 25A, 25B:
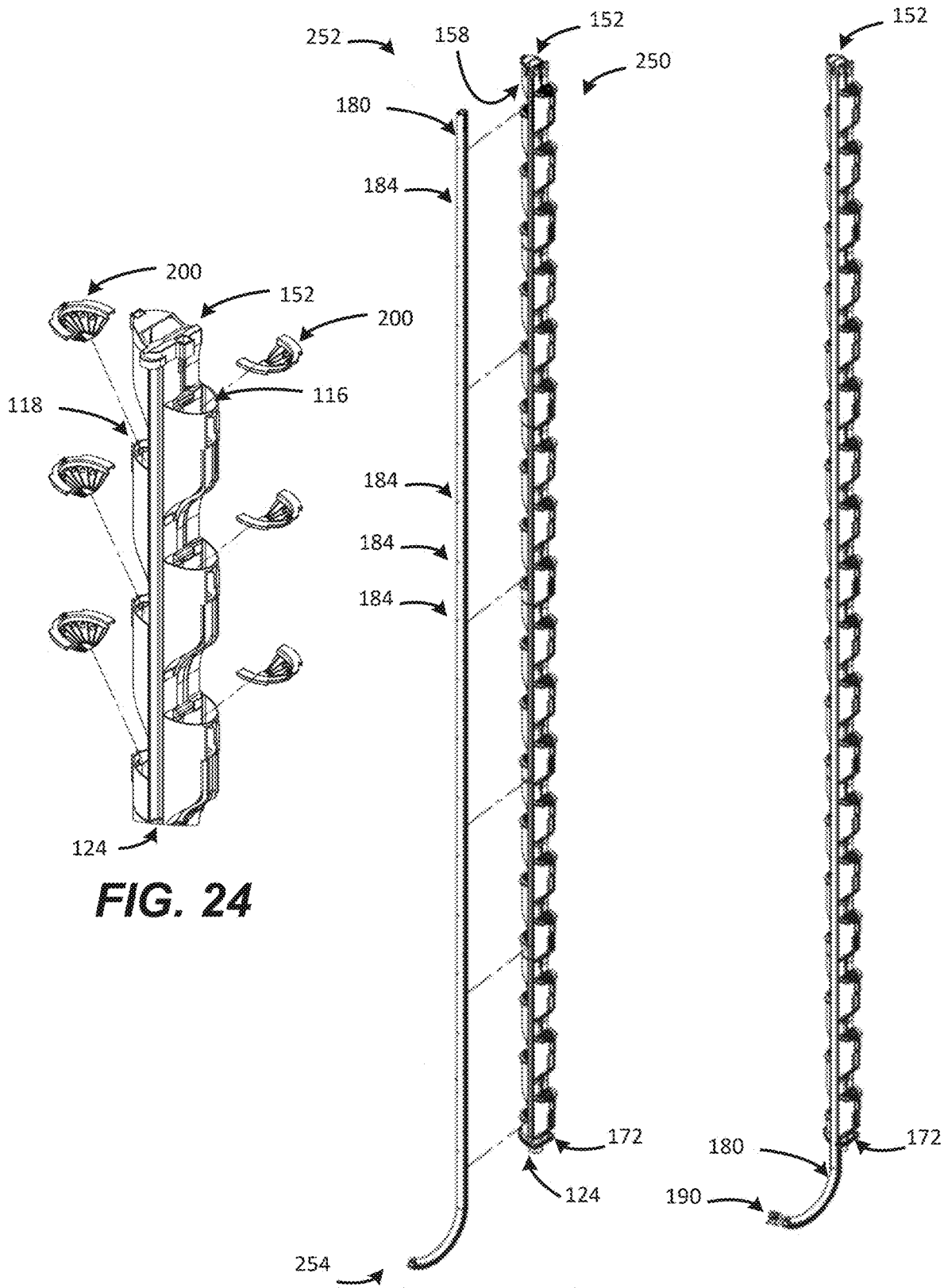
FIG. 24 illustrates an example of coupling the planting tray of FIG. 20A to an assembled planter of FIG. 13A.
FIGS. 25A and 25B illustrate an example of coupling the conduit of FIG. 18A to assembled planters of FIG. 13A.

Referring to FIG. 24, an example of trays (e.g., the tray 200) being inserted into a planter (e.g., 10, 50, 110) is shown. For example a first tray 200 is configured to be inserted into the plant holder 116 and a second tray 200 is configured to be inserted into the plant holder 118.

Referring to FIGS. 25A and 25B, examples of coupling of the conduit 180 to the channel 124 of a plant tower is shown. For example, FIG. 25A shows the conduit 180 being coupled to the channel 124 and FIG. 25B shows the coupler 190 configured to be coupled to the conduit 180.

A planter 250 (e.g., a plant tower) include the channel 124. The planter 250 may include or correspond to the plant tower 50. In some implementations, the planter 250 may be incorporated into a greenhouse, such as the greenhouse 100 of FIG. 11. The planter 250 includes the channel 124 that longitudinally extends along a body of the planter. The conduit 180 has a first end 252 and a second end 254. The conduit includes outlets 184 positioned between the first end 252 and the second end 254. The conduit 180 is inserted into the channel 124. In is noted that the first end 252 of the conduit 180 is inserted into the gas conduit 158 of the end member 152. The second end 254 of the conduit 180 is inserted into the first end 197 of the coupler 190. In some implementations, an adhesive may be used to couple one or more components together. For example, the first end 252 of the conduit 180 may be coupled to the gas conduit 158 of the end member 152 to ensure a leak free connection.

Figure 26A:
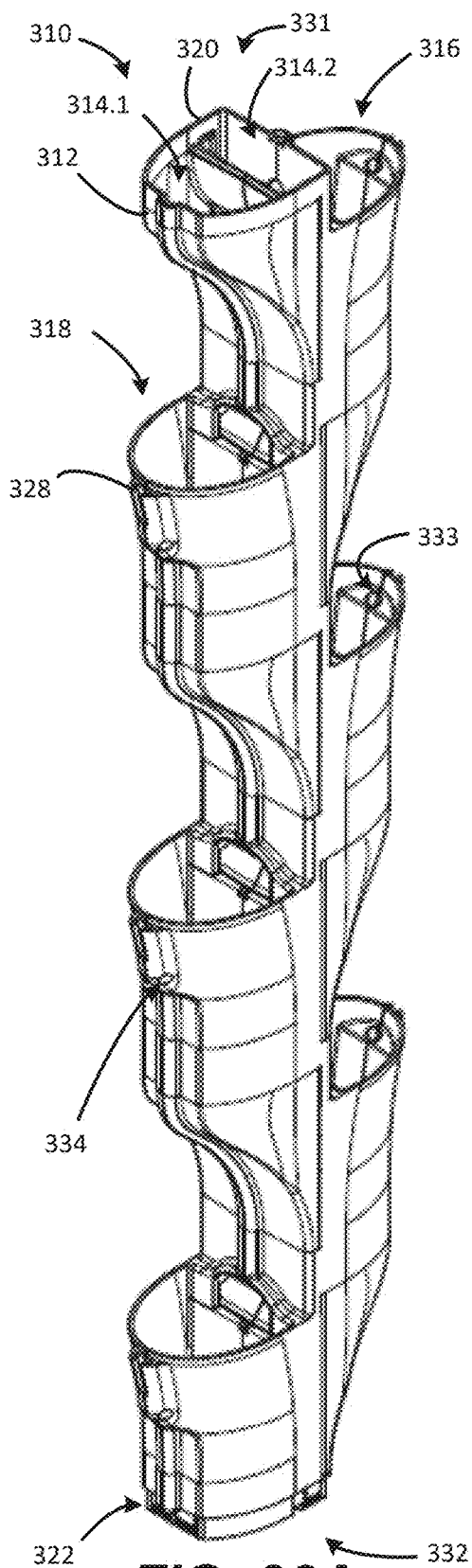
FIGS. 26A and 26B illustrate perspective views of an example of a planter.
Figure 26B:
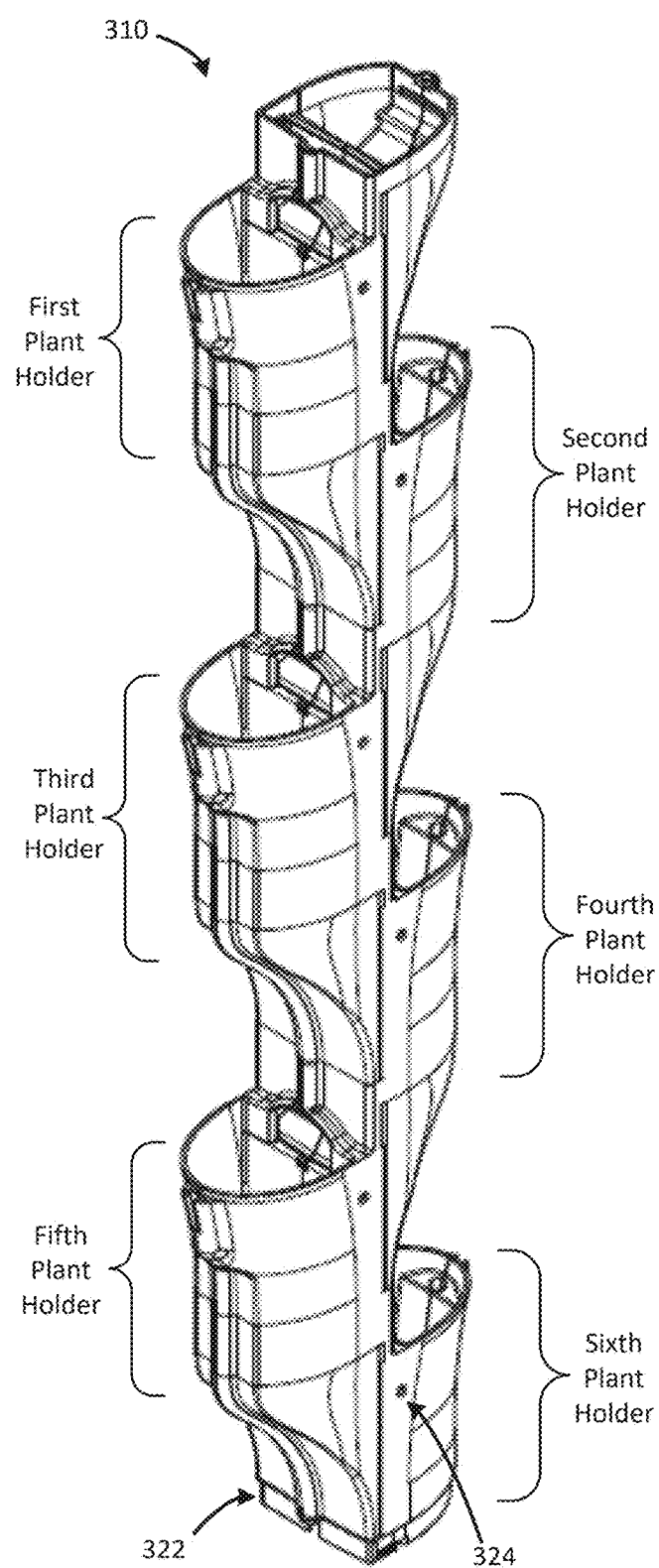

Referring to FIGS. 26A, 26B, 27A, 27B, 28A, and 28B, an example of a planter 310 is shown. For example, FIGS. 26A and 26B illustrate perspective views of planter 310, FIGS. 27A and 27B illustrate two halves of the planter 310 of FIGS. 26A and 26B, FIG. 28A shows a side view of a portion of planter 310 of FIG. 26A, and FIG. 28B shows an exploded view of a portion of the side view of FIG. 28A. Planter 310 may include or correspond to a planter, a planter assembly, or a planter tower. For example, planter 310 may include or correspond to planter 10, planter assembly 50 (e.g., planter tower 50.1-50.10), planter 110, and/or planter 250 (e.g., a plant tower). To illustrate, planter 310 may incorporate one or more features as described with reference to planter 10, planter assembly 50, planter 110, and/or planter 250.

Planter 310 has a longitudinal body 312. The planter 310 includes a first end 331 and a second end 332 that is opposite the first end 331. As an illustrative, non-limiting example, the longitudinal body 312 may include multiple portions (e.g., two halves) 312.1 and 312.2 that are configured to be coupled together. Views of a first portion 312.1 (e.g., a first half) are shown with reference to FIGS. 27A, 28A, and 28B. A views of a second portion 312.2 (e.g., a second half) is shown with reference to FIG. 27B.

The longitudinal body 312 defines two longitudinally extending liquid channels 314.1 and 314.2. For example, a first liquid channel 314.1 extends between the first end 331 and the second end 332 and a second liquid channel 314.2 extends between the first end 331 and the second end 332. The first fluid channel 314.1 and second fluid channel 314.2 may corresponds to and/or define fluid paths 315.1, 315.2, respectively, between the first end 331 and the second end 332. The first liquid channel 314.1 is distinct from the second liquid channel 314.2. To illustrate, the longitudinal body 312 may include a single longitudinal conduit which is internally divided (by a divider 313) into the at least two longitudinally extending liquid channels 314.1 and 314.2.

The planter 310 includes at least two plant holders, such as representative plant holders 316, 318 defined on the outer circumference of the longitudinal body. The plant holders 316, 318 may include or correspond to the plant holders 16, 18, 116, 118. The at least two plant holders 316, 318 are alternatively spaced on opposed sides of the longitudinal body. The at least two plant holders 316, 318 have holder mouths which may be in the form of applanated cylindrical ellipses or in another form. Each of the two plant holders 316, 318 has corresponding openings 316.1, 318.1 defining liquid inlets to the plant holder and corresponding openings 316.2, 318.2 defining liquid outlets from the plant holders. To further illustrate, each plant holder 316, 318 has a corresponding inlet opening 316.1, 318.1 and a corresponding outlet opening 316.2, 318.2, respectively, which forms part of its corresponding liquid channel 314.2 and 314.1. As can be seen, the inlet openings 316.1, 318.1 are located above the outlet openings 316.2, 318.2 to permit liquid to flow into the plant holders 316, 318 through the inlet openings 316.1, 318.1 and from the plant holder through the outlet opening 316.2, 318.2. In some implementations, an inlet opening (e.g., 316.1, 318.1) may include or correspond to a ridge 335. For example, ridge 335 may extend (e.g., protrude) from a surface 337 of divider 313. Ridge 335 may include or correspond to ridge 117. Liquid may travel within a liquid channel (e.g., 314.1, 314.2) along a surface 338 and/or the surface 337. As the liquid travels downward, liquid that travels along the surface 337 toward the ridge 335 encounters ridge 335 and is caused to splash and/or flow over ridge 335, such that the liquid cascades or otherwise flows into a next downstream plant holder and improve a wetting coverage of a plant or seed(s) in the next downstream plant holder. In some implementations, ridge 335 operates to reduce or slow a flow of the liquid through the liquid channel (e.g., 314.1, 316.1) and thereby reduce damage that could be caused by fast moving liquid to downstream plants. In some implementations, ridge 335 extends across an entire width of the inlet opening (e.g., 316.1, 318.1). In other implementation, ridge 335 only extends across a portion of the width of the inlet opening (e.g., 316.1, 318.1), such as shown in at least FIGS. 1A. and 1B.

Longitudinal body 312 may also include one or more overflow channels 333 (e.g., bypass channels). The overflow channel 333 may include or correspond to the overflow channel 119. The overflow channel 333 may be configured to bypass a portion of a corresponding liquid channel 314. An overflow channel may have an overflow inlet 333.1 positioned in a plant holder 316, 318, such as near a rim or mouth of the plant holder 316, 318. In other implementations, the overflow inlet may be offset from the rim or mouth of the plant holder 316, 318, such that the overflow inlet is closer to a middle of the plant holder 316, 318 or is positioned between a middle of the plant holder 316, 318 and a rim of the plant holder 316, 318. The overflow channel 333 may have an overflow outlet 333.2 that is open to a corresponding liquid channel.

As shown (e.g., identified) in at least FIG. 26B, planter 310 includes a first plant holder, a second plant holder, a third plant holder, a fourth plant holder, a fifth plant holder, and a sixth plant holder. It is noted that the opening (e.g., the liquid outlet) of the sixth plant holder may include or correspond to an opening associated with the second end 332.

The longitudinal body 312 has connecting formations 320, 322 in the form of socket and spigot formations at the ends of the longitudinal body 312. The connecting formations may include or correspond to the connecting formations 20, 22, 120, 122 described above. The connecting formations 320, 322 are shaped and dimensioned to fit into respective spigot and socket formations of corresponding planters and/or corresponding end members. For example, the operative lower end of the longitudinal body 312 of the planter 310 has a spigot formation 322, for fitting into a socket formation 320 on an operative upper end of a longitudinal body 312 of another planter installed below the former planter.

The planter 310 further includes mounting ports 324 along the longitudinal body 312. As shown, planter 310 includes six mounting ports on the same side (e.g., a single side) of the planter. In other implementations, planter 310 may have more than or fewer than six mounting ports. Additionally, or alternatively planter 310 may have mounting ports on more than one side of the planter 310. To illustrate, planter 310 may have mounting ports 324 as shown on a first side and may include additional mounting ports on a second side of the planter that is opposite the first side. In some implementations, a first set of mounting ports may be aligned vertically. To illustrate, a first set of mounting ports that are aligned vertically include mounting ports of the first plant holder, the third plant holder, and the fifth plant holder. A second set of mounting ports that are aligned vertically include mounting ports of the second plant holder, the fourth plant holder, and the sixth plant holder. Each of the mounting ports 324 is configured to receive and support a mounting bracket. An example of a mounting bracket is described with reference to at least FIG. 33.

Mounting brackets may be coupled to the mounting ports 324 to enable one or more gas channels (e.g., gas conduits) to be mounted to planter 310. Each of the one or more gas channels may have gas outlets spaced along its length. The gas outlets, such as nozzles) may open to the outside of the planter body. In some implementations, mounting brackets may be positioned in the mounting ports 324 to support a single gas channel. For example, mounting brackets coupled to the first and second set of mounting ports may be aligned to support a single gas channel (e.g., a single gas conduit). In other implementations, mounting brackets coupled to the first set of mounting ports may be aligned to support a first gas channel and mounting brackets coupled to the second mounting ports may be aligned to support a second gas channel. In implementations including multiple gas channels, the first gas channel may include outlets directed toward the first, third, and fifth plant holders, and the second gas channel may include outlets directed toward the second, fourth, and sixth plant holders. Additionally, or alternatively, the gas channel(s) may be directed toward plant holders of an neighboring planter assembly.

Planter 310 has an external attachment formation 328 proximate the plant holder mouth for attaching plant supports. One example of such a plant support is the plant trellis 30, shown in FIG. 9, which has a corresponding attachment formation 32, which can fit into the attachment formation 328, spigot and socket fashion. The creeper trellis 30 is arranged to support a creeper plant (not shown), planted in the plant holder when it grows from the plant holder mouth 316, 318. The planter 310 also has external attachment formations in the form of apertures 334, for holding wire, line or cables that can provide additional structural strength to the planter 310 (or an assembly of multiple planters 310) or to provide a structure onto which creepers can grow.

A mouth of a plant holder (e.g., 316, 318) may be configured to receive and/or support a planting inserts, such as a seedling tray, a planting tray, a seeding clip, or other insert. The planting inserts may be selected based on its suitability for a specific plant. Illustrative, non-limiting examples of planting inserts for use with planter 310 include the seedling tray 60, the planting tray 70, the seeding clip 80, or a tray 200 of FIGS. 20A-20D. Additional inserts are described further herein with reference to FIGS. 31A, 31B, 32, and 34A-34G.

In a particular implementation, a planter 310 includes a longitudinal body 312 defining at least two longitudinally extending liquid channels 314.1, 314.2. The planter 310 also includes at least two plant holders (e.g., 316, 318) defined in the body 312. The plant holders (e.g., 316, 318) are spaced on the outer circumference of the longitudinal body 312. Each one of the at least two plant holders (e.g., 316, 318) is in fluid flow communication with one of the at least two longitudinally extending liquid channels 314.1, 314.2. In some implementations, the longitudinal body 312 may include a single longitudinal conduit which is internally divided (e.g., by at least the divider 313) to define the at least two longitudinally extending liquid channels 314.1, 314.2.

Figure 29A:
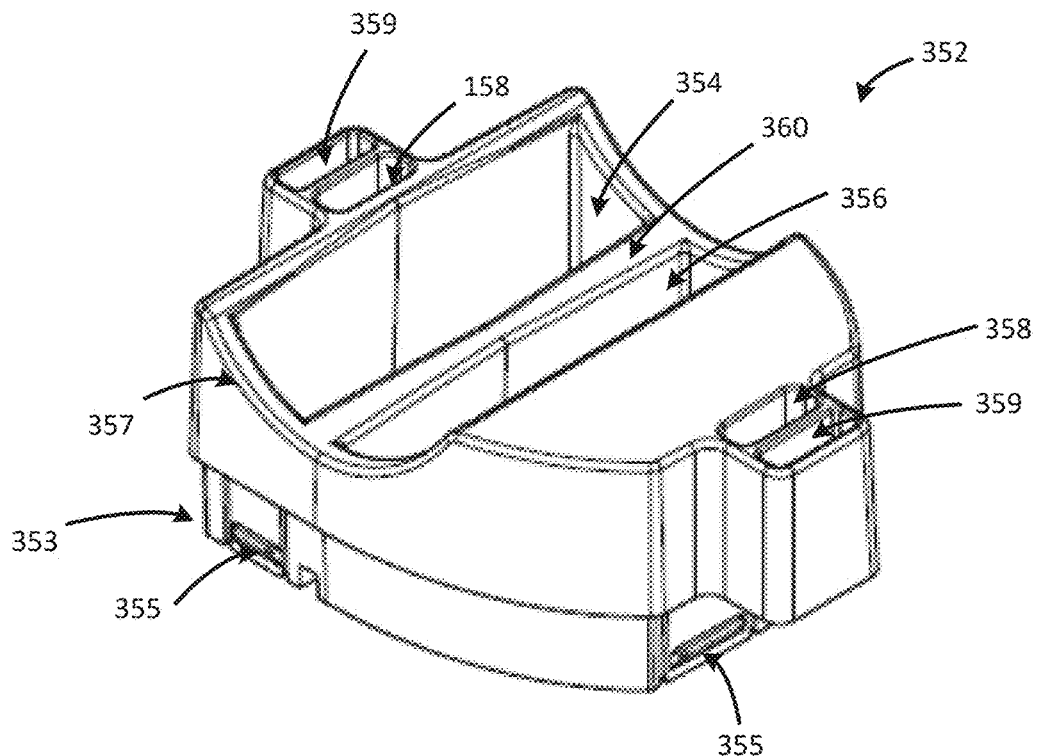
FIGS. 29A and 29B show views of an example of an end member of a planter.
Figure 29B:
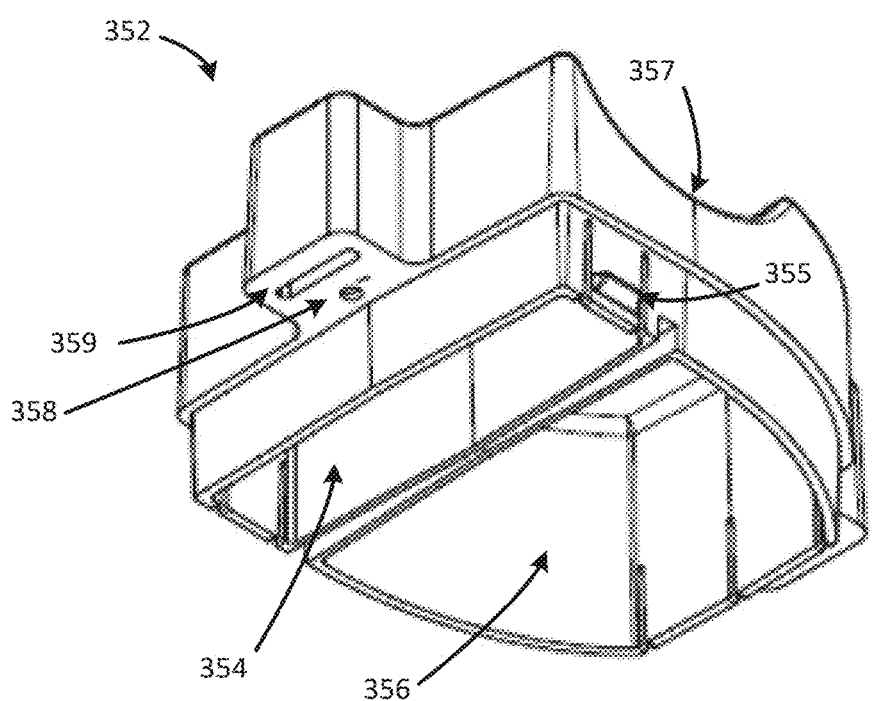

Referring to FIGS. 29A and 29B, an example of an end member 352 (e.g., a top end member) is shown. FIG. 29A includes a top perspective view of the end member 352, and FIG. 29B includes a bottom perspective view of the end member 352. The end member 352 may be referred to as a canopy of a planter (e.g., 10, 110, 310) or a planter assembly (e.g., 50). The end member 352 is configured to fit socket and spigot fashion onto a top of a longitudinal body (e.g., 12, 112, 312) of a planter.

The end member 352 has dual liquid conduits 354, 356 indexed to match longitudinally extending liquid channels, such as liquid channels 14.1, 14.2, liquid channels 114.1, 114.2, or liquid channels 314.1, 314.2. Liquid conduits 354, 356 may be separated by divider 360. The end member 352 includes connector apertures 359 through which a connector, such as a tie, may be inserted. An example of a connector is described at least with reference to FIG. 16D which may be coupled to the end member 352 in a similar manner as described with reference to the end member 152 (e.g., see FIG. 16E). The end member 352 may also include apertures 358. Aperture 358 may be configured as a breather hole and/or an inlet.

The end member 352 has a body with two sides, an upper side which is provided with a recessed cradle formation 257 for receiving a liquid supply line (e.g., 102, 170), such as a pipe, and a bottom side which is provided with a spigot formation 353 for fitting onto matched socket formations of a first end of a longitudinal body (e.g., 12, 112, 312) of a planter. An example of the end member 352 positioned to be coupled to a planter (e.g., 310) is described at least with reference to FIG. 34.

As shown, spigot formation 353 includes one or more couplers 355, such as one or more clips. In some implementations, a matching socket formation (e.g., 20, 120, 320) of a planter includes receiving portions configured to engage the one or more couplers 355. Although, spigot formation 353 is shown as having multiple couplers, in other implementations, spigot formation may include no couplers.

Figure 30A:
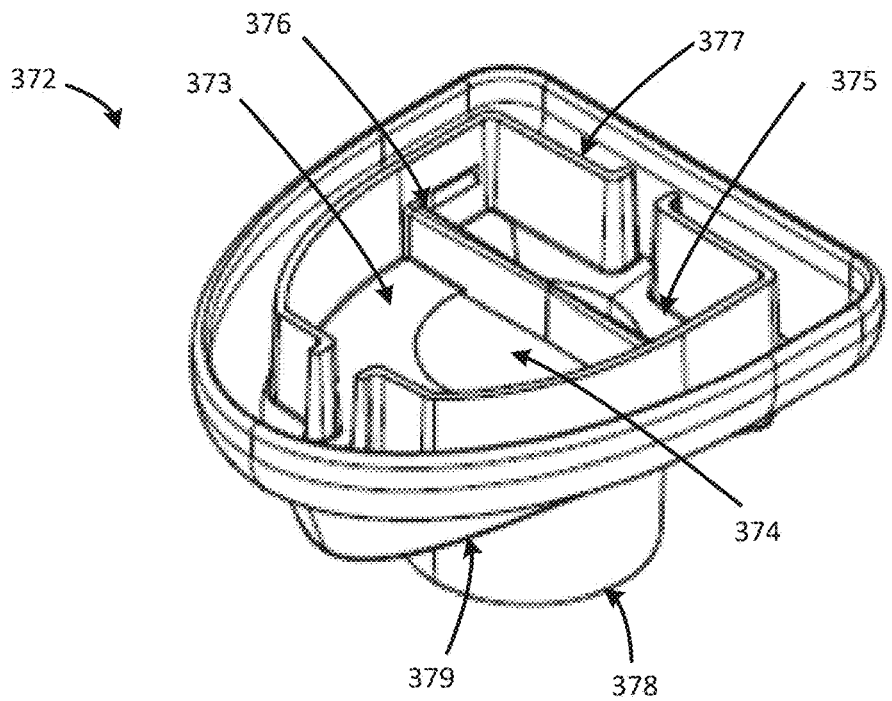
FIGS. 30A and 30B show views of another example of an end member of a planter.
Figure 30B:
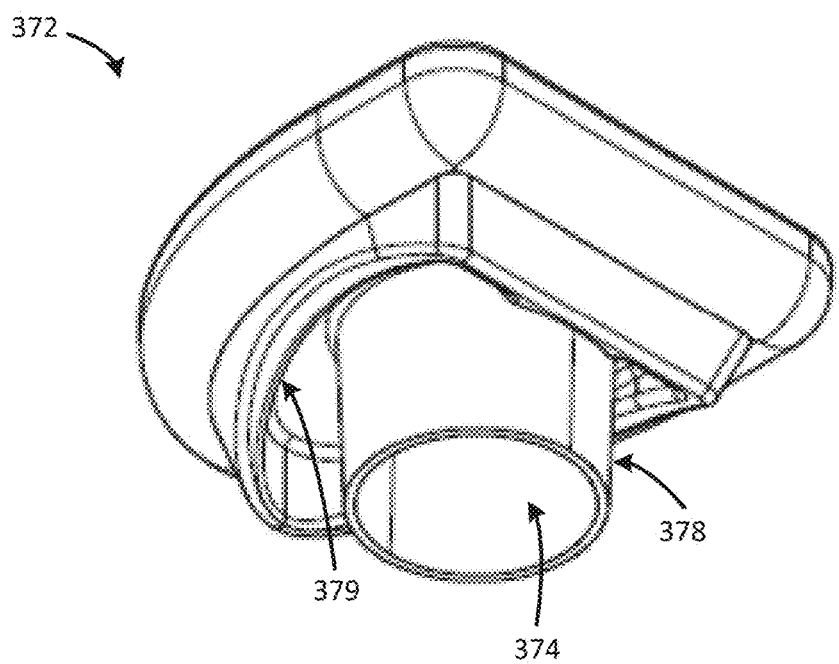

Referring to FIGS. 30A and 30B, an example of an end member 372 (e.g., a bottom end member) is shown. FIG. 30A includes a top perspective view of the end member 372 and FIG. 30B includes a bottom perspective view of the end member 372. The end member 372 may be referred to as a base of a planter (e.g., 10, 110, 310) or a planter assembly (e.g., 50). The end member 372 is configured to fit socket and spigot fashion onto a top of a longitudinal body (e.g., 12, 112, 312) of a planter.

The end member 372 has liquid conduits 373, 375 configured to receive longitudinally extending liquid channels, such as liquid channels 14.1, 14.2, liquid channels 114.1, 114.2, or liquid channels 314.1, 314.2. In some implementations, the liquid conduits may be divided by a divider 376. The end member 372 has a body with two sides, an upper side which is provided with a socket formation(s) 377 for fitting onto matched spigot formations of a second end of a longitudinal body (e.g., 12, 112, 312) of a planter and a bottom side which is provided with a recessed cradle formation 379 and a connector 378 (e.g., coupler) for coupling to a liquid outlet line (e.g., a pipe), such as outlet line 103. For example, recessed cradle formation 379 may be coupled to an outside surface of the liquid outlet line and the connector 378 may fit into an opening of the liquid outlet line. An example of the end member 372 positioned to be coupled to a planter (e.g., 310) is described at least with reference to FIG. 34. The end member 372 includes a channel 374 that enables liquid received via the liquid conduits 373, 375 to be provided through the connector 378 to the liquid outlet line (not shown).

Figure 31A:
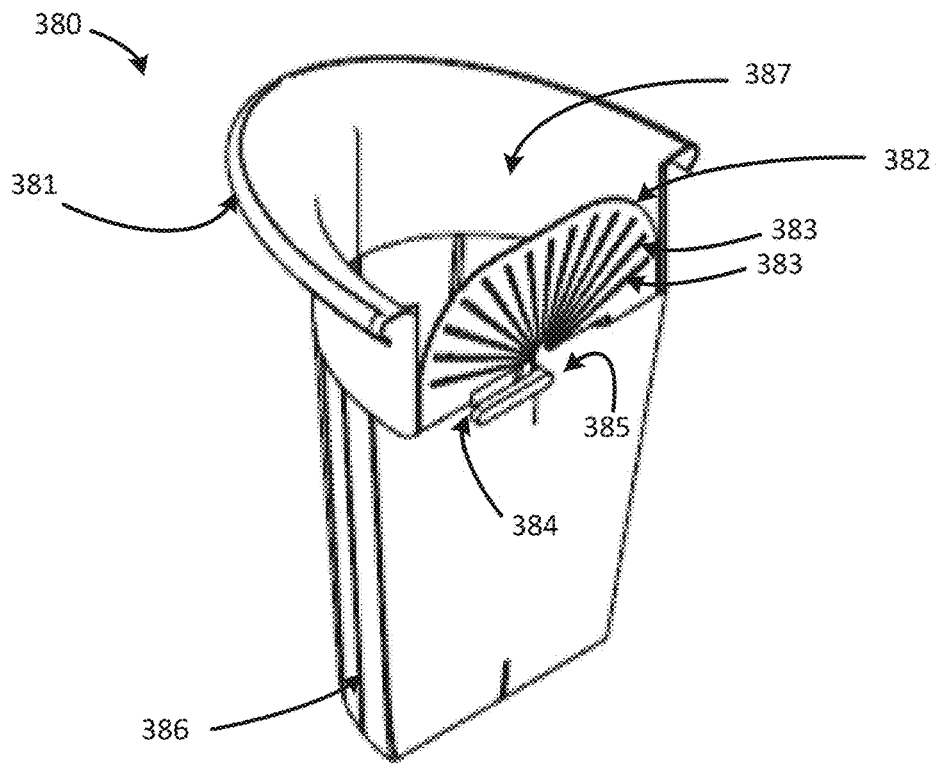
FIGS. 31A and 31B show views of an example of a planting tray of a planter.
Figure 31B:
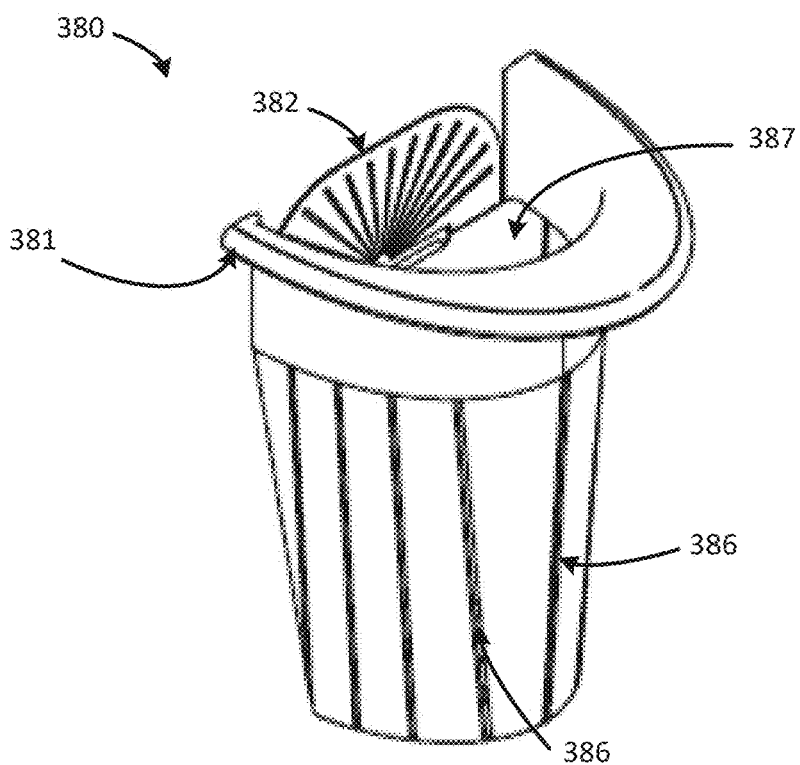

In FIGS. 31A and 31B, a planting tray 380 is shown, which is shaped and dimensioned to fit into a mouth of a plant holder (e.g., 16, 18, 116, 118, 316, 318). For example, planting tray 380 includes a rim 381 configured to rest on an edge of the mouth of the plant holder. The planting tray 380 is in the form of a cylindrical body shaped to the shape of the plant holder. In some implementations, the cylindrical body may be tapered. The planting tray 380 includes an opening 387 into which seeds may be placed into the planting tray 380. The planting tray 380 includes an inlet cover 382 configured to be indexed with the inlet openings of the plant holder (e.g., 16.1, 18.1, 116.1, 118.1, 316.1, 318.1). The inlet cover 382 includes inlet slits 383, an opening 384, and a liquid guide 385. The inlet cover 382 is configured to deflect and slow the flow of liquid into planting tray 380. The planting tray 380 has a planar base and sidewalls including drainage slits 386. The portion of the sidewall is slightly tapered towards the base.

Figure 32:
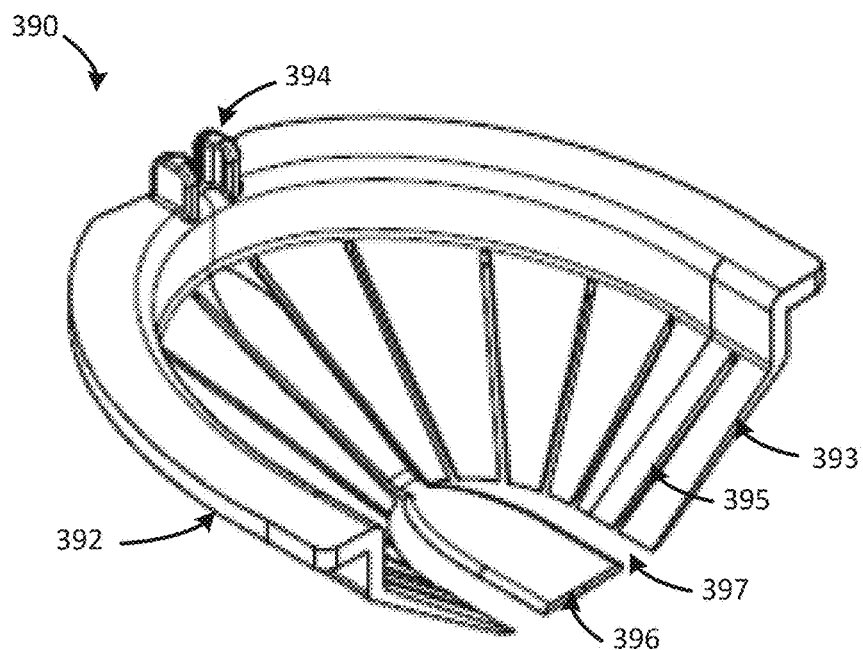
FIG. 32 illustrates another example of a planting tray of a planter.

Referring to FIGS. 32, an example of a tray 390 is shown. Tray 390 may be configured to be used as a seedling tray, a planting tray, a seeding clip, or a combination thereof. Tray 390 is shaped and dimensioned to fit into a mouth of a plant holder (e.g., 16, 18, 116, 118, 316, 318). The tray 390 includes one or more rims 392 (e.g., a rim portion) that are configured to be coupled with an edge of the mouth of the plant holder. The tray 390 includes multiple fins 393 that extend from the rim 392 in a downward direction. At least one of the fins is coupled to a planar bottom 396. The adjacent fins (e.g., 393) are separated by one or more drainage slits 395. The drainage slits 395 are configured to permit liquid drainage without flushing seedlings from the tray 390. The drainage slits 395 open into one or more channel openings 397 positioned between the planar bottom 396 the ends of the fins 393. Tray 390 also includes a slot 394. The slot 394 may be configured to engage a stem or stalk of a plant. For example, the slot 394 may engage a stem to secure a position of a plant. It is noted, that as a plant grows while supported by/within tray 390, roots of the plant may extend through the drainage slits 208, the channel openings 397, or both. The plant may be removed from the tray 390 in a direction away from the slot 394 and towards the planar bottom 396 such that the roots slide down the slits 395 and out the channel openings 397, and damage to the root structure of the plant is limited.

Figure 33:
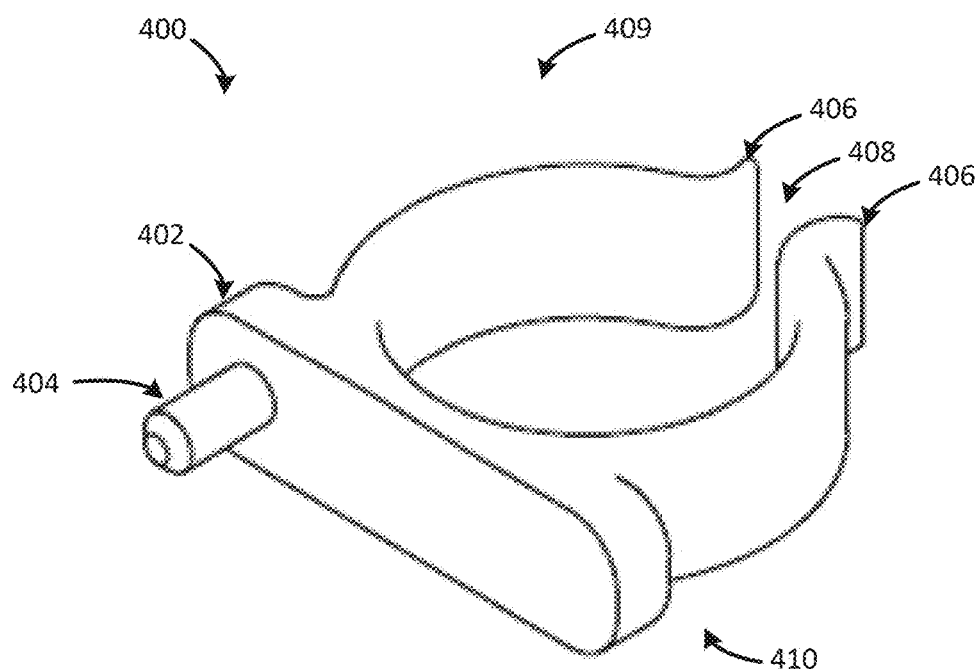
FIG. 33 illustrates an example of a mounting bracket of a planter.

Referring to FIGS. 33, an example of a mounting bracket 400 is shown. The mounting bracket 400 includes a base 402, a mounting coupler 404 (e.g., a post), and coupling arms 406. The mounting coupler 404 is configured to be coupled to a mounting port, such as mounting port 324 of planter 310. The arms 406 define an opening 408 and are configured to receive and be coupled to a conduit, such as a gas conduit (e.g., a pipe). Mounting bracket includes a first side 409 and a second side 410 opposite the first side 409. In some implementations, mounting bracket 400 may be coupled to a mounting port (e.g., 324) such that the first side 409 is a top side of the mounting bracket 400. In other implementations, mounting bracket 400 may be coupled to a mounting port (e.g., 324) such that the second side 410 is a top side of the mounting bracket 400.

Figure 34A:
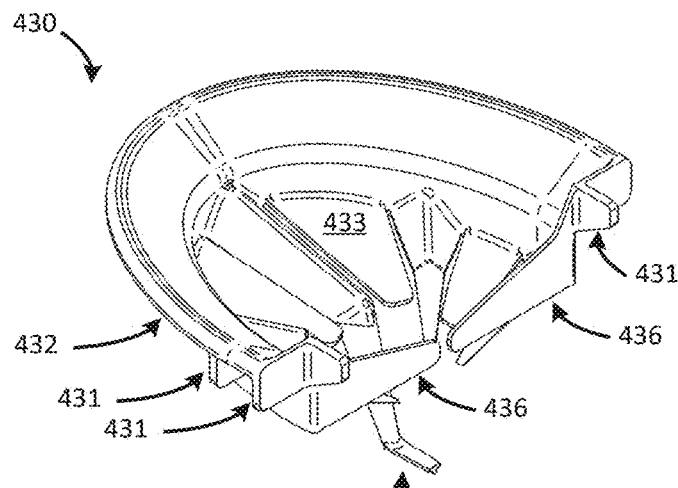
FIGS. 34A to 34D illustrate another example of a planting tray of a planter.
Figure 34B:
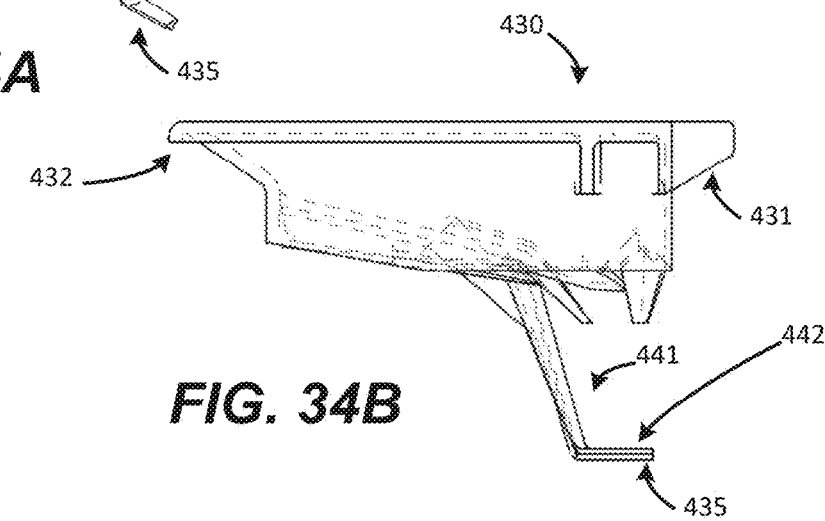
Figure 34C:
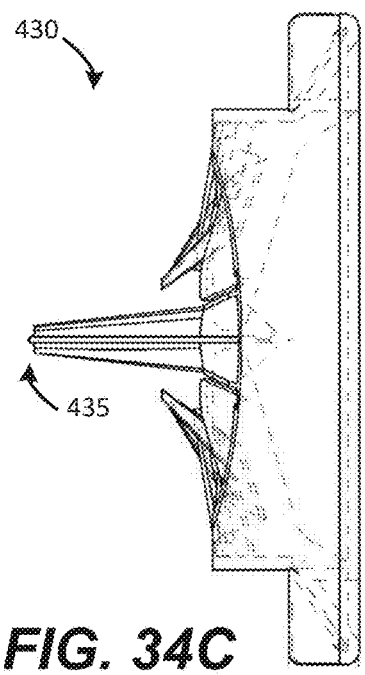
Figure 34D:
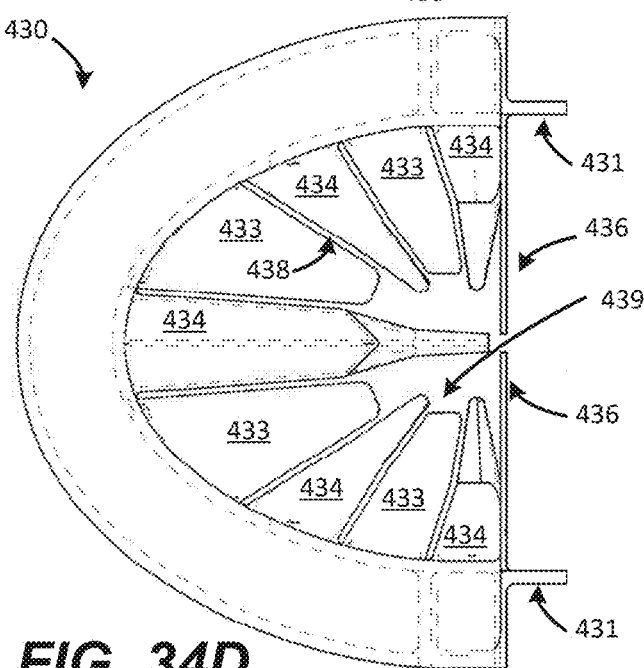
Figure 34E:
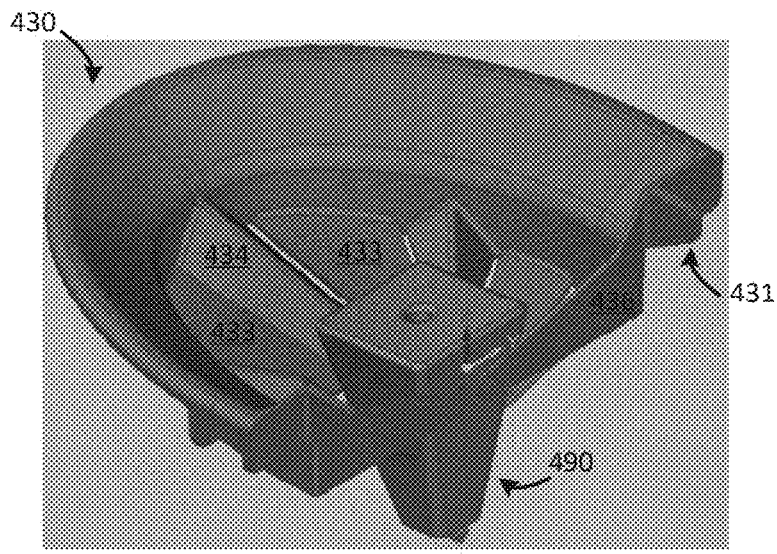
FIGS. 34E to 34H illustrate an example of the planting tray of FIG. 34A with a seed holder.
Figure 34F:
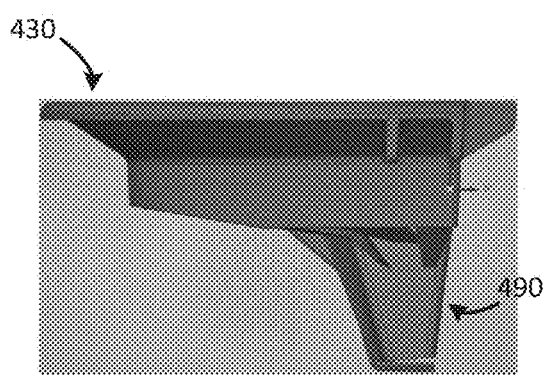
Figure 34G:
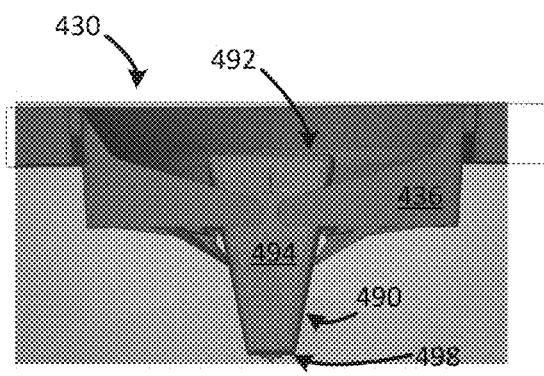
Figure 34H:
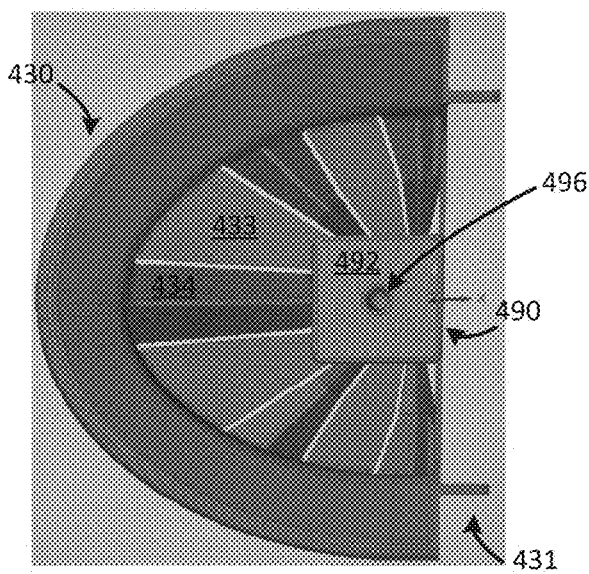

Referring to FIGS. 34A-34G, an example of a tray 430 is shown. For example, FIG. 34A shows a perspective view of the tray 430, FIG. 34B shows a side view of the tray 430, FIG. 34C shows a front view of the tray 430, and FIG. 34D shows a top view of the tray 340. Additionally, FIGS. 34E-34H show tray 430 with a seed holder 490. For example, FIG. 34E shows a perspective view of the tray 430 with seed holder 490, FIG. 34F shows a side view of the tray 430 with seed holder 490, FIG. 34G shows a rear view of the tray 430 with seed holder 490, and FIG. 34H shows a top view of the tray 340 with seed holder 490.

Tray 430 may be configured to be used as a seedling tray, a planting tray, a seeding clip, or a combination thereof. In some implementations, tray 430 is configured to be used with seed holder 490, as described with reference to FIGS. 34E-34H. Tray 430 is shaped and dimensioned to fit into a mouth of a plant holder (e.g., 16, 18, 116, 118, 316, 318). The tray 430 includes one or more rims 432 (e.g., a rim portion) that are configured to be coupled to and/or interface with an edge of the mouth of the plant holder. Tray 430 may also include one or more tabs 431 (e.g., one or more flanges). For example, tray 430 may include a first set of tabs at a first position along rim 432 and a second set of tabs at a second position along rim 432. The one or more tabs 431 may be configured to enable installation and removal of tray 420 into a mount of a plant holder. For example, the one or more tabs 431 may be configured to be coupled to and/or engage a tool, such as a y-fork type tool or a tong. To illustrate, the one or more tabs 431 may enable the tool to be coupled to opposite sides of tray 430 to enable tray 430 to be securely installed and/or removed from a plan holder mouth. Such a tool may have one or more "fingers" that extend outward to enable coupling and release of tray 430 minimal to no damage of a plant corresponding to tray 430 and/or to neighboring or nearby plants. It is also noted that by using a tool for installation and/or removal of tray 430, a person does not have to use his or her hands to reach and physically remove tray 430, which may inadvertently cause damage to a plant (corresponding to tray 430) or to neighboring plants (in neighboring plant holders). Additionally, or alternatively, in some implementations, the one or more tabs 431 may be configured to provide support and/or stabilize tray 430 with respect to the mouth of the plant holder and/or with respect to the body of the planter. For example, one or more tabs 431 adjacent to rim 432 may stabilize tray 430 with respect to the edge of the mouth. Additionally, or alternatively, one or more tabs 431 extending rearward from tray 430 may be configured to be positioned in openings or indentations of the body of the planter or may be configured to be positioned on a side of the body—e.g., two tabs 431 may be positioned such that when tray 430 is positioned in the mouth, the body is positioned between the two tabs 431.

The tray 430 includes multiple fins 433, one or more supports 434, and one or more bracket 436. Fins 433, and supports 434 may extend from rim 432 in a downward direction. The adjacent/neighboring fins (e.g., 393) and supports 434 are separated by one or more drainage slits 438. The drainage slits 438 open to an opening 439 (e.g., a gap). For example, drainage slits 438 open to opening 439 (e.g., a gap) when no seed holder 490 is positioned in tray 430. The one or more supports 434 may include an extension portion (e.g., 441) that extends downward and is configured to support and/or stabilize seed holder 490. In some implementations, at least one of the supports 434 includes a bottom portion (e.g. 435) configured to support seed holder 490 from the bottom of seed holder. Bracket(s) 436 are configured to provide support for seed holder 490, as described with reference to FIGS. 34E-34H. In some implementations, one or more of fins 433 may instead be supports 434. Alternatively, in other implementations, one or more of support 434 may instead be fins 433. Additionally, or alternatively, although tray 430 is shown as having a single bottom portion 435, in other implementations, tray 430 may have no bottom portion 435 or multiple bottom portions 435—e.g., multiple bottom portions a particular support and/or multiple supports with bottom portions.

Referring to FIGS. 34E-34H, tray 430 is shown with seed holder 490 (e.g., a plug). Seed holder 490 includes a top surface 492, one or more side surfaces 494, and a bottom surface 498. Additionally, seed holder 490 defines a cavity 496, such as a cavity configured to hold one or more seeds. The one or more side walls 494 are configured to contact one or more of supports 434. Bottom surface is configured to contact bottom portion 435. Although shown as having an inverted pyramidal shape, seed holder 490 is not to limited to such a shape and may have other shapes, such as a cone.

Figure 35:
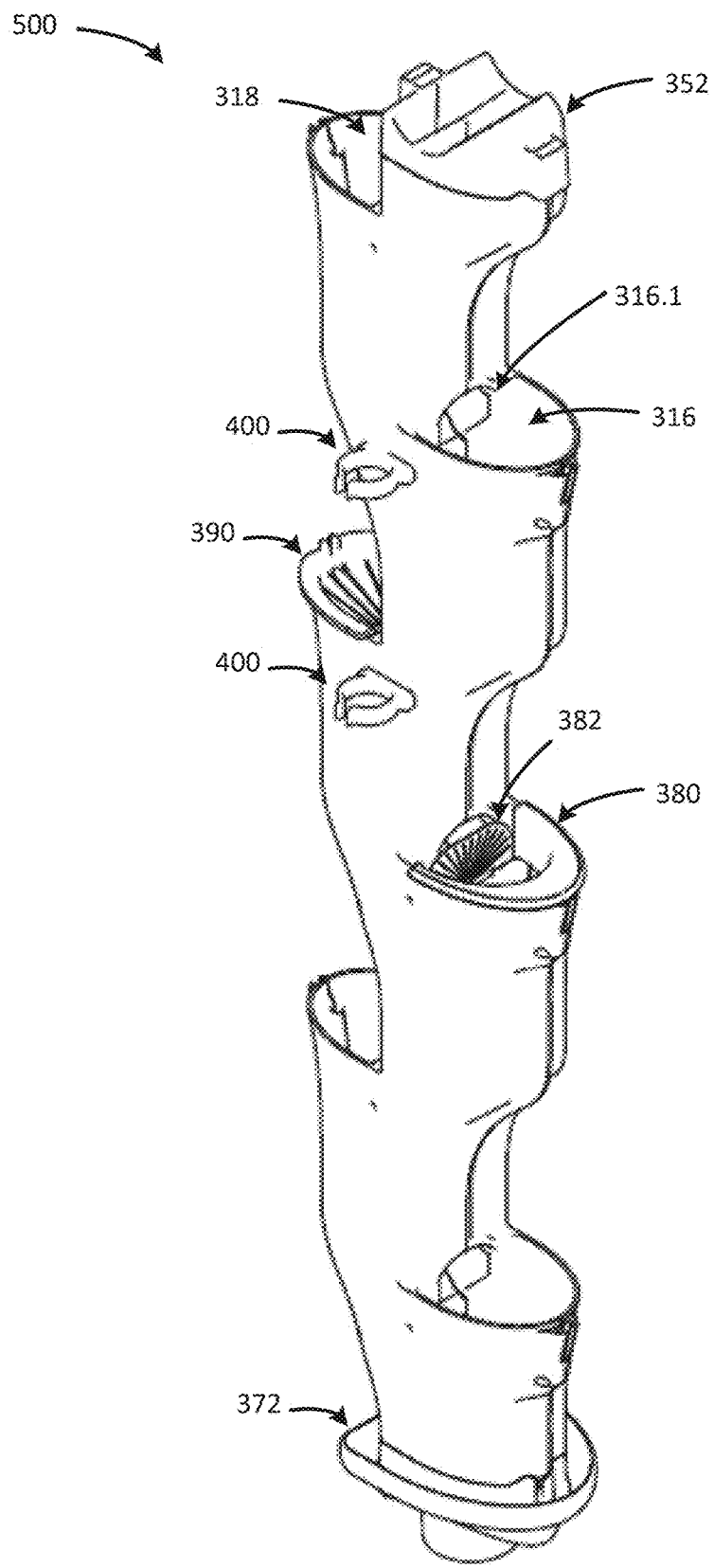
FIG. 35 illustrates an example of a planter.

FIG. 35 shows a planter 340 (e.g., a planter assembly) in accordance with a further aspect of the disclosure. Planter assembly 500 may include or correspond to a least planter tower 50 or planter 10, 110, 250, 310. In this example, the planter tower 420 includes a planter 310 configured to have plant holders, such as plant holders 316, 318, extending from the sides of the planter assembly 500. As can be seen in FIG. 34, the plant holders 316, 318 which are alternatively spaced on opposed sides over the length of the of the planter tower (e.g., 500).

Referring to FIG. 35, an example of trays (e.g., the tray 200, tray 380, tray 390, or tray 430) being inserted into a planter (e.g., 10, 50, 110, 310, 420) is shown. For example a first tray 380 is configured to be inserted into the plant holder 316 and a second tray (e.g., 390 or 430) is configured to be inserted into the plant holder 318. Mounting brackets 400 may be coupled to planter 500 and positioned to be vertically aligned. A conduit (not shown), such as a gas tube, may be coupled to the mounting brackets.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this disclosure. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiments. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments. Accordingly, no single implementation described herein should be construed as limiting and implementations of the disclosure may be suitably combined without departing from the teachings of the disclosure.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A planter which includes
a longitudinal body defining at least two longitudinally extending liquid channels, the longitudinal body including one or more mounting ports configured to receive a mounting bracket configured to enable coupling of a conduit to be coupled to the longitudinal body via the mounting bracket; and
at least two plant holders defined in the body, the plant holders spaced on the outer circumference of the longitudinal body, each one of the at least two plant holders in fluid flow communication with one of the at least two longitudinally extending liquid channels,
and wherein the conduit includes at least one longitudinally extending gas channel, the gas channel having gas outlets spaced along its length, in which the gas outlets in the form of nozzles open to the outside of the planter body and in which the gas channel is coupled to the one or more mounting ports via the mounting bracket;
and in which:
each plant holder includes an inlet opening and an outlet opening, which is in flow communication with its corresponding liquid channel, and
the inlet opening is located above the outlet opening to permit gravitational liquid flow into the plant holder through the inlet opening and liquid flow from the plant holder through the outlet opening, and
a ridge is positioned adjacent to the inlet opening, the ridge extending at least partially along a length of the inlet opening.

2. The planter as claimed in claim 1, further comprising:
the mounting bracket, the mounting bracket including a post configured to engage a mounting port of the one or more mounting ports and a coupler configured to secure the conduit in a coupled state with the mounting bracket.

3. The planter as claimed in claim 1, in which:
the one or more mounting ports include multiple mounting ports on a first side of the planter, the multiple mounting ports include:
a first set of mounting ports; and
a second set of mounting ports; and
when the mounting port and the conduit are coupled to the longitudinal body via the one or more mounting ports, the conduit is positioned between the first set of mounting ports and the second set of mounting port.

4. The planter as claimed in claim 3, in which:
the longitudinal body includes a divider configured to divide at least a portion of a longitudinal conduit of the longitudinal body into the at least two longitudinally extending liquid channels;
wherein:
the first set of mounting ports on the first side of the planter are vertically aligned and positioned on a first side of the divider,
the second set of mounting ports the first side of the planter are vertically aligned and positioned on a second side of the divider,
a first set of plant holders of the at least two plant holders are positioned on the first side of the divider, and
a second set of plant holders of the at least two plant holders are positioned on the second side of the divider.

5. The planter as claimed in claim 1, in which:
the planter includes an external attachment formation associated with each plant holder for attaching a plant support, and in which the attachment formation is located below the plant holder mouth;
the mounting bracket includes a base;
the post extends from a first side of the base in a first direction;
the coupler includes one or more coupling arms that extend from a second side of the base in a second direction that is opposite the first direction; and
the one or more coupling arms define an opening configured to receive the conduit.

6. The planter as claimed in claim 1, further comprising:
planting inserts shaped and dimensioned to fit into mouths of the at least two plant holders and in which the planting inserts are selected from any one or more of: a seedling tray, a planting tray and a seeding clip; and
in which:
the longitudinal body includes a longitudinal conduit which is internally divided to define the at least two longitudinally extending liquid channels; and
the longitudinal body further defining an overflow channel having an inlet associated with the first plant holder and an outlet posited below the inlet.

7. The planter as claimed in claim 6, in which the planting tray is in the form of a cylindrical body shaped to the shape of the plant holder and includes an inlet opening indexed with the inlet opening of the plant holder, the planting tray includes a planar base cut in sections to provide drainage slits to permit liquid drainage without flushing seedlings from the seedling tray.

8. The planter as claimed in claim 7, in which a portion of the planting tray sidewall also includes drainage slits, in which a portion of the sidewall is slightly tapered towards the base, or both.

9. The planter as claimed in claim 1, in which:
a seedling tray is shaped based on the shape of the plant holder and includes an inlet opening indexed with the inlet opening of the plant holder, the seedling tray includes drainage slits to permit liquid drainage without flushing seedlings from the seedling tray.

10. The planter as claimed in claim 1, in which the planter includes one or more planting inserts shaped and dimensioned to fit into mouths of the at least two plant holders, and in which the one or more planting inserts are selected from a group of planting inserts including: a seedling tray, a planting tray and a seeding clip.

11. The planter as claimed in claim 1, in which:
the planter includes one or more planting inserts shaped and dimensioned to fit into mouths of the at least two plant holders;
the one or more planting inserts are selected from a group of planting inserts including: a seedling tray, a planting tray and a seeding clip; and
a first planting insert of the one or more planting inserts includes:
multiple fins, a planar bottom coupled to at least one fin, a slit positioned between two fins of the multiple fins, or a combination thereof.

12. The planter as claimed in claim 11, in which a second planting insert of the one or more planting inserts includes:
a seed holder positioned in the seedling tray, and
a channel positioned between the planar bottom and an end of at least one fin.

13. A planter tower comprising:
a plurality of planters as claimed in claim 1, connected together to form an elongate upright planter with plant holders extending from the sides of the planter tower.

14. The planter tower as claimed in claim 13, which includes at least one end member, shaped and dimensioned to connect onto an end of the plurality of planters connected together, and in which the planter tower includes two end members, a top end member for connecting to the top end of the plurality of planters and a bottom end member for connecting to the bottom end of the plurality of planters.

15. The planter tower as claimed in claim 14, which includes at least one end member, shaped and dimensioned to connect onto an end of the plurality of planters connected together, and in which the at least one end member includes a catchment tray, for receiving any overflow liquid.

16. The planter tower as claimed in claim 13, in which each planter includes a gas channel, the gas channel extends over the length of the interconnected planters.

17. A hydroponic greenhouse, which includes an array of planter towers as claimed in claim 12, the planter towers arranged in parallel spaced rows, the rows being provided with a top liquid supply line, connected via an intake closure to a top of each of the planter towers, the rows further being provided with a bottom liquid collection line, connected via an outlet closure to a bottom of each of the planter towers; and
a liquid circulation system, connected to the liquid supply lines and the liquid collection lines.

18. The hydroponic greenhouse as claimed in claim 17, wherein the rows being provided with a top gas supply line connected via the intake closure to the top of each of the planter towers and provided with a bottom gas collection line connected via the outlet closure to the bottom of each of the planter towers.

19. The hydroponic greenhouse as claimed in claim 18, further comprising:
a gas circulation system, connected to the gas supply lines and the gas collection lines.

* * * * *